(12) United States Patent
Kito et al.

(10) Patent No.: US 10,518,634 B2
(45) Date of Patent: Dec. 31, 2019

(54) FUEL SUPPLY APPARATUS

(71) Applicant: TOYODA GOSEI CO., LTD., Kiyosu-shi, Aichi-ken (JP)

(72) Inventors: Hiroaki Kito, Kiyosu (JP); Sanae Noro, Gifu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 126 days.

(21) Appl. No.: 15/646,149

(22) Filed: Jul. 11, 2017

(65) Prior Publication Data
US 2018/0015821 A1    Jan. 18, 2018

(30) Foreign Application Priority Data
Jul. 12, 2016  (JP) .................... 2016-137387

(51) Int. Cl.
*B60K 15/04*   (2006.01)
*B60K 15/03*   (2006.01)

(52) U.S. Cl.
CPC .................... *B60K 15/04* (2013.01)

(58) Field of Classification Search
CPC .. B60K 2015/03493; B60K 2015/0458; B60K 2015/0464; B60K 2015/047; B60K 2015/0474; B60K 2015/0477; B60K 2015/0483; B60K 2015/049
USPC ........................ 141/350; 220/86.2
See application file for complete search history.

(56) References Cited

U.S. PATENT DOCUMENTS 4,702,386 A * 10/1987 Boehmer ............... B60K 15/04
141/285

FOREIGN PATENT DOCUMENTS

| JP | S63-002723 A | 1/1988 |
| JP | 2015-067139 A | 4/2015 |
| JP | 2015-160558 A | 9/2015 |

OTHER PUBLICATIONS

Office Action dated Jul. 2, 2019 issued in corresponding JP patent application No. 2016-137387 (and English translation).

* cited by examiner

*Primary Examiner* — Marina A Tietjen
*Assistant Examiner* — Paul J Gray
(74) *Attorney, Agent, or Firm* — Posz Law Group, PLC

(57) ABSTRACT

A fuel supply apparatus for supplying fuel to a fuel tank, includes: a flow path forming member configured to form a fuel flow path; and an injection port forming member, arranged in the fuel flow path, configured to form an injection port into which a fueling nozzle, configured to discharge the fuel, is inserted, wherein at least one of the flow path forming member and the injection port forming member includes an impact absorbing part to be contacted with the other and configured to absorb an impact to be produced by the fueling nozzle when the fueling nozzle comes into contact with the injection port forming member.

1 Claim, 28 Drawing Sheets

FIFTH EMBODIMENT

<NON-INSERTED STATE>

FIFTH EMBODIMENT

<INSERTED STATE>

FUEL SUPPLY APPARATUS

CROSS-REFERENCE TO RELATED APPLICATION(S)

This application is based upon and claims the benefit of priority from Japanese Patent Application No. 2016-137387, filed on Jul. 12, 2016, the entire contents of which are incorporated herein by reference.

BACKGROUND

1. Field of the Invention

The invention relates to a fuel supply apparatus.

2. Description of the Related Art

As a fuel supply apparatus mounted on a vehicle for supplying fuel to a fuel tank, there is known an apparatus having a configuration in which an injection port forming member for forming an injection port allowing insertion of a fueling nozzle is inserted into a cylindrical flow path forming member for forming a fuel flow path called a filler pipe or a filler neck (see JP-A-2015-160558).

In a configuration in which the injection port forming member is inserted into the flow path forming member as mentioned above, there is a fear that, when inserting the fueling nozzle, the fueling nozzle can strike the injection port forming member and apply an external force thereto in a direction substantially parallel to the insertion direction, thereby damaging the injection port forming member. Also, during fueling, there is a fear that the fueling nozzle can rest on the injection port forming member and apply an external force thereto in a direction perpendicular to the insertion direction, thereby damaging the injection port forming member. Supposing the thickness of the injection port forming member is designed to the optimum value in order to suppress such damage and the manufacture of the injection port forming member is controlled so as to provide such design value, much time is taken. Thus, a technology capable of easily suppressing the damage of the injection port forming member is expected.

SUMMARY

The invention is made to solve at least a part of the above problems and can be realized as follows.

According to an aspect of the invention, there is provided a fuel supply apparatus for supplying fuel to a fuel tank, including: a flow path forming member configured to form a fuel flow path; and an injection port forming member, arranged in the fuel flow path, configured to form an injection port into which a fueling nozzle, configured to discharge the fuel, is inserted, wherein at least one of the flow path forming member and the injection port forming member includes an impact absorbing part to be contacted with the other and configured to absorb an impact to be produced by the fueling nozzle when the fueling nozzle comes into contact with the injection port forming member.

According to the fuel supply apparatus of this aspect, at least one of the flow path forming member and the injection port forming member includes an impact absorbing part to be contacted with the other and capable of absorbing an impact to be produced by the fueling nozzle when it comes into contact with the injection port forming member. Therefore, in inserting the fueling nozzle, even when the fueling nozzle strikes the injection port forming member to apply an external force thereto in a direction substantially parallel to the striking direction, an impact due to such external force can be absorbed by the impact absorbing part, thereby enabling suppression of damage against the injection port forming member. Also, during fueling, even when the fueling nozzle rests on the injection port forming member to apply thereto an external force in a direction intersecting with the insertion direction, an impact due to such external force can be absorbed by the impact absorbing part, thereby enabling suppression of damage against the injection port forming member.

In the fuel supply apparatus of the above aspect, the flow path forming member may have a cylindrical external shape and includes a supporting projection part projecting in the inside diameter direction along at least a part of the whole periphery of the inner peripheral surface of the flow path forming member; the injection port forming member may have a cylindrical external shape and is stored in the axial hole of the flow path forming member; and, the impact absorbing part may have flexibility, may project in the outside diameter direction at least in a part of the whole periphery of the outer peripheral surface of the injection port forming member along the peripheral direction, and may be arranged so as not to be connected to the supporting projection part.

According to the fuel supply apparatus of this aspect, in the fueling nozzle inserting time or the like, an impact due to an external force applied from the fueling nozzle can be absorbed by the impact absorbing part being flexed. In addition, since the impact absorbing part is arranged so as not to be connected to the supporting projection part, when compared with a configuration in which the impact absorbing part and supporting projection part are connected to each other, it is possible to suppress the transmission of the impact absorbed by the impact absorbing part to the flow path forming member through the supporting projection part, thereby enabling suppression of damage against the flow path forming member. Also, since the impact absorbing part is arranged so as not to be connected to the supporting projection part, when compared with a configuration in which the impact absorbing part and supporting projection part are connected to each other, the fuel supply apparatus can be manufactured easily.

In the fuel supply apparatus of the above aspect, the impact absorbing part may be formed over the whole periphery of the outer peripheral surface of the injection port forming member along the peripheral direction, and may include multiple notches arranged side by side in the peripheral direction. According to the fuel supply apparatus of this aspect, since the impact absorbing part includes the multiple notches arranged side by side in the peripheral direction, when compared with a configuration which does not include such multiple notches, the impact absorbing part can be flexed more greatly, thereby enabling greater absorption of the impact.

In the fuel supply apparatus of the above aspect, the flow path forming member may have a cylindrical external shape; the injection port forming member may have a cylindrical external shape, may be stored in the axial hole of the flow path forming member, and may include a supported projection part projecting in the outside diameter direction along at least a part of the whole periphery of the outer peripheral surface of the flow path forming member; the impact absorbing part may have flexibility and may project in the inside diameter direction at least in a part of the whole periphery of the inner peripheral surface of the flow path forming member along the peripheral direction; and, the supported projection part may be arranged so as not to be connected to the impact absorbing part.

According to the fuel supply apparatus of this aspect, in the fueling nozzle inserting time or the like, while the fueling nozzle applies an external force which causes an impact, on receiving such impact through the supported projection part, the impact absorbing part is flexed, thereby enabling absorption of the impact. Also, since the supported projection part is arranged so as not to be connected to the impact absorbing part, when compared with a configuration in which the supported projection part and impact absorbing part are connected to each other, the fuel supply apparatus can be manufactured easily.

In the fuel supply apparatus of the above aspect, the impact absorbing part may be formed over the whole periphery of the inner peripheral surface of the flow path forming member along the peripheral direction, and may include multiple notches arranged side by side in the peripheral direction. According to the fuel supply apparatus of this aspect, since the impact absorbing part includes the multiple notches arranged side by side in the peripheral direction, when compared with a configuration not having such multiple notches, the impact absorbing part can be bent more greatly, thereby enabling greater absorption of the impact.

In the fuel supply apparatus of the above aspect, the flow path forming member may have a cylindrical external shape; the injection port forming member may have a cylindrical external shape and may be stored in the axial hole of the flow path forming member; the impact absorbing part may have flexibility and may project in a direction intersecting with the outside diameter direction at least in a part of the whole periphery of the outer peripheral surface of the injection port forming member along the peripheral direction; and the end portion of the impact absorbing part in the outside diameter direction may not be connected to the inner peripheral surface of the flow path forming member but may be in contact therewith.

According to the fuel supply apparatus of this aspect, when the fueling nozzle is resting during fueling or the like, an impact due to an external force applied from the fueling nozzle can be absorbed by the impact absorbing part being flexed. In addition, since the leading end portion of the impact absorbing part is not connected to the inner peripheral surface of the flow path forming member but is in contact therewith, when compared with a configuration in which the leading end portion of the impact absorbing part and the inner peripheral surface of the flow path forming member are connected to each other, it is possible to suppress the transmission of the impact absorbed by the impact absorbing part to the flow path forming member through the inner peripheral surface of the flow path forming member, thereby enabling suppression of damage against the flow path forming member. Also, since the leading end portion of the impact absorbing part is not connected to the inner peripheral surface of the flow path forming member but is in contact therewith, when compared with a configuration in which the leading end portion of the impact absorbing part and the inner peripheral surface of the flow path forming member are connected to each other, the fuel supply apparatus can be manufactured easily.

In the fuel supply apparatus of the above aspect, the impact absorbing part may be formed along the whole periphery of the outer peripheral surface of the injection port forming member along the peripheral direction, and may include multiple notches arranged side by side in the peripheral direction. According to the fuel supply apparatus of this aspect, since the impact absorbing part has the multiple notches arranged side by side in the peripheral direction, when compared with a configuration not having such multiple notches, the impact absorbing part can be flexed more greatly, thereby enabling greater absorption of the impact.

In the fuel supply apparatus of the above aspect, the flow path forming member may have a cylindrical external shape; the injection port forming member may have a cylindrical external shape and may be stored in the axial hole of the flow path forming member (20d); the impact absorbing part may have flexibility and may project in a direction intersecting with the inside diameter direction at least in a part of the whole periphery of the inner peripheral surface of the flow path forming member along the peripheral direction; and, the end portion of the impact absorbing part in the inside diameter direction may not be connected to the outer peripheral surface of the injection port forming member but may be in contact therewith.

According to the fuel supply apparatus of this aspect, in the fueling nozzle inserting time and in the resting time of the fueling nozzle during fueling, an impact due to an external force applied from the fueling nozzle can be absorbed by the impact absorbing part being flexed. In addition, since the leading end portion of the impact absorbing part is not connected to the outer peripheral surface of the injection port forming member but is in contact therewith, when compared with a configuration in which the leading end portion of the impact absorbing part is connected to the outer peripheral surface of the injection port forming member, the fuel supply apparatus can be manufactured easily.

In the fuel supply apparatus of the above aspect, the impact absorbing part may be formed over the whole periphery of the inner peripheral surface of the flow path forming member along the peripheral direction, and may include multiple notches arranged side by side in the peripheral direction. According to the fuel supply apparatus of this aspect, since the impact absorbing part has the multiple notches arranged side by side in the peripheral direction, when compared with a configuration not having such multiple notches, the impact absorbing part can be bent more greatly, thereby enabling greater absorption of the impact.

The invention can also be realized in various aspects other than the fuel supply apparatus. For example, the invention can be realized in aspects such as a flow path forming member for use in a fuel supply apparatus, an injection port forming member for use in a fuel supply apparatus, a vehicle which mounts a fuel supply apparatus thereon, a fueling method using a fuel supply apparatus, and a method for manufacturing a fuel supply apparatus.

According to the invention, at least one of the flow path forming member and the injection port forming member includes an impact absorbing part to be contacted with the other and capable of absorbing an impact to be produced by the fueling nozzle when it comes into contact with the injection port forming member. Therefore, in inserting the fueling nozzle, even when the fueling nozzle strikes the injection port forming member to apply an external force thereto in a direction substantially parallel to the striking direction, an impact due to such external force can be absorbed by the impact absorbing part, thereby enabling suppression of damage against the injection port forming member. Also, during fueling, even when the fueling nozzle rests on the injection port forming member to apply thereto an external force in a direction intersecting with the insertion direction, an impact due to such external force can be absorbed by the impact absorbing part, thereby enabling suppression of damage against the injection port forming member.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

A. First Embodiment

A1. Apparatus Overall Configuration

Figure 1:
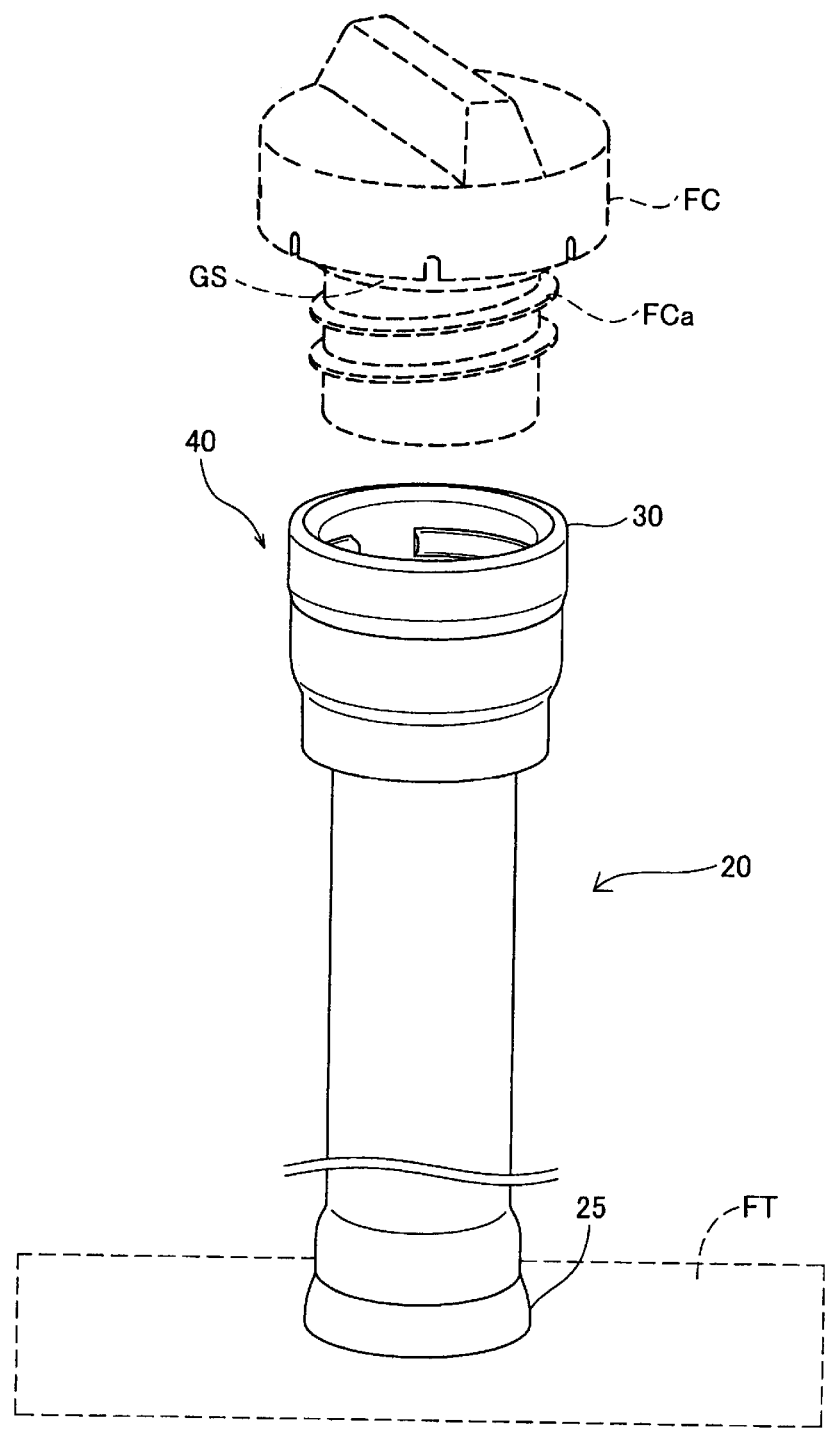
FIG. 1 is a perspective view of the external configuration of a fuel supply apparatus according to a first embodiment of the invention.

FIG. 1 is a perspective view of the external configuration of a fuel supply apparatus 40 according to a first embodiment of the invention. As shown in FIG. 1, the fuel supply apparatus 40 has a cylindrical external shape. A fuel cap FC is mounted on one end (which is open) thereof and it is connected to a fuel tank FT through a connecting part 25 formed in the other end thereof. In this embodiment, the fuel tank FT is mounted on a vehicle. Here, the fuel tank FT may not be mounted on the vehicle. When performing refueling using the fuel supply apparatus 40, a user removes the fuel cap FC from the fuel supply apparatus 40 and inserts a fueling nozzle (not shown) into the fuel supply apparatus 40 for refueling. Fuel discharged from the fueling nozzle (not shown) is supplied to the fuel tank FT through a fuel supply route within the fuel supply apparatus 40.

Figure 2:
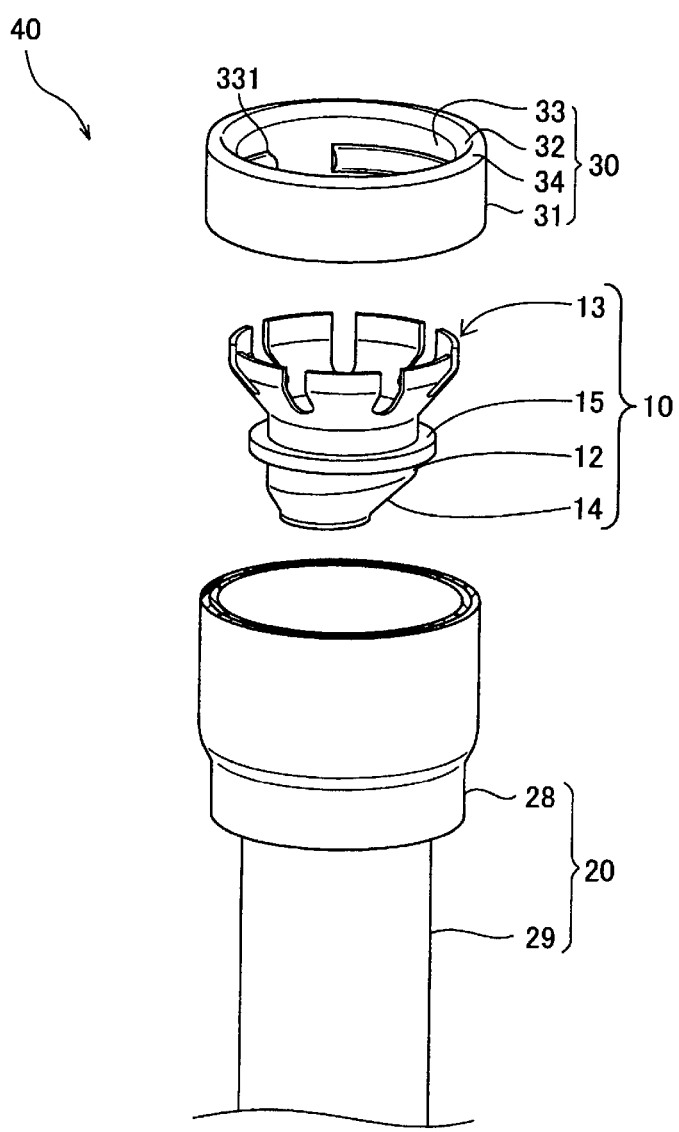
FIG. 2 is an exploded perspective view of the fuel supply apparatus.
Figure 3:
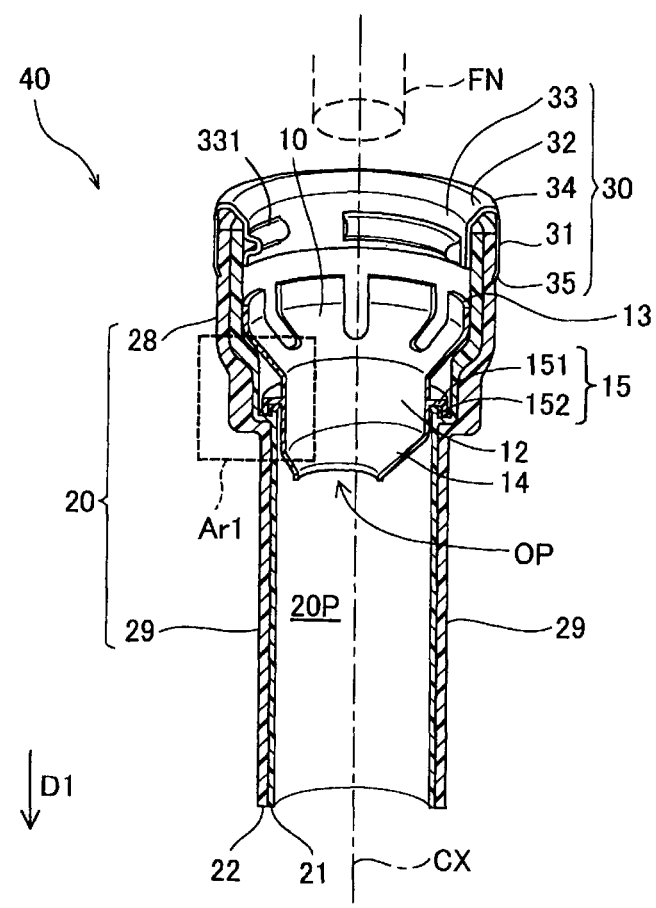
FIG. 3 is a broken perspective view of the fuel supply apparatus.

FIG. 2 is an exploded perspective view of the fuel supply apparatus 40. FIG. 3 is a broken perspective view of the fuel supply apparatus 40. As shown in FIGS. 1 and 2, the fuel supply apparatus 40 includes, in addition to the above-mentioned connecting part 25, a flow path forming member 20, a retainer 30, and an injection port forming member 10. The flow path forming member 20 has a cylindrical external shape and, as shown in FIG. 3, forms a fuel flow path 20P. In this embodiment, the flow path forming member 20 is formed of resin material, and includes a neck part 28 and a pipe part 29. The neck part 28 is connected to the end of the pipe part 29 and is formed larger in both inside diameter and outside diameter than the pipe part 29. Such end of the pipe part 29 as exists on the opposite side to the end thereof connected to the neck part 28 is connected to the connecting part 25. The retainer 30 is a metal-made annular member and is mounted on the neck part 29 in such a manner that it covers the whole periphery of such end of the neck part 29 as exists on the opposite to the end thereof connected to the neck part 28. The retainer 30 enhances sealability between the fuel cap FC and fuel supply apparatus 40, and also enhances the mechanical strength of the open end face of the neck part 28. The injection port forming member 10 is stored (inserted) into an axial hole of the neck part 28 of the flow path forming member 20 and is arranged in a fuel flow path 20P. The injection port forming member 10 forms an injection port OP into which a fueling nozzle FN is to be inserted. In this embodiment, the injection port forming member 10 is formed of resin material.

As shown in FIG. 3, into the fuel supply apparatus 40, there is inserted a fueling nozzle FN in a direction D1 (which is hereinafter called a fueling direction) along the central axis CX of the fuel supply apparatus 40. The fueling direction D1 is a direction which extends from the opening end of the neck part 28 toward the connecting portion between the pipe part 29 and fuel tank. Hereinafter, a leading end side in the fueling direction D1 is simply called "a leading end side", while a base end side in the fueling direction D1 is simply called "a base end side". When the fueling nozzle FN is inserted, the leading end side thereof is inserted into the injection port OP formed by the injection port forming member 10 and the position displacement thereof within the fuel flow path 20P is thereby restricted. Fuel discharged from the fueling nozzle FN flows within the fuel supply apparatus 40 in a direction substantially in parallel to the fueling direction D1. As shown in FIG. 3, each of the composing elements of the fuel supply apparatus 40 has a substantially cylindrical shape or a substantially annular shape, and the central axis thereof substantially coincides with the central axis CX of the fuel supply apparatus 40.

A2. Configurations of Respective Parts

A2-1. Configuration of Flow Path Forming Member 20:

As shown in FIG. 3, to form the flow path forming member 20, two layers (an inside layer 21 and an outside layer 22) formed of mutually different kinds of resin material are laminated in the radial direction. The radial direction means a direction perpendicular to the central axis CX (which is also hereinafter called "plying direction"). Hereinafter, of the radial direction, a direction along the radial direction with the central axis CX as a base point is called an outside diameter direction, while a direction going toward the central axis CX along the radial direction is called an inside diameter direction. The inside layer 21 is situated inside (on the inside diameter direction side) when compared with the outside layer 22. Therefore, the inside layer 21 is in contact with the injection port forming member 10 and is allowed to come into contact with fuel in circulation. It is formed of resin material having high resistance to fuel permeation, high compressive strength and high flexual strength. As this resin material, in this embodiment, polyamide (PA) is employed. As polyamide, for example, nylon 6 and nylon 66 can be used. The outside layer 22 is situated outside (on the outside diameter direction side) when compared with the inside layer 21. It is formed of resin material having high impact strength. As this resin material, in this embodiment, high density polyethylene (HDPE) is used. Here, the flow path forming member 20 may not be formed of the two layers but may also be formed of a single layer made of single resin material.

Figure 4:
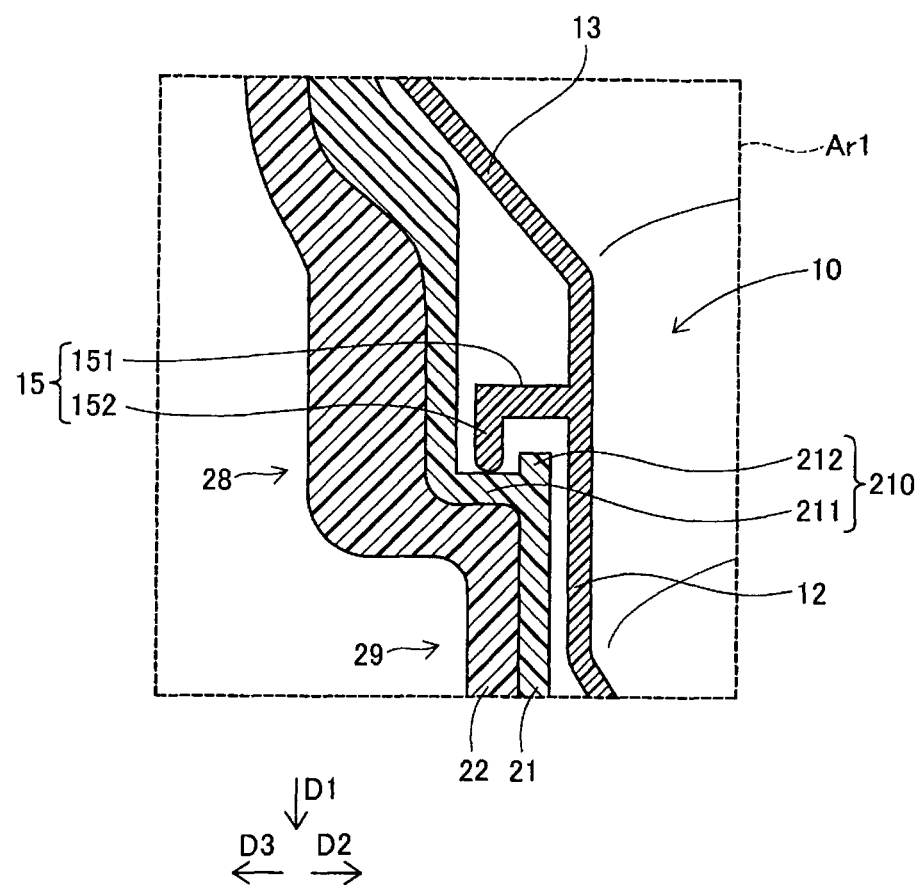
FIG. 4 is an enlarged explanatory view of an area Ar1 shown in FIG. 3.

FIG. 4 is an enlarged explanatory view of an area Ar1 shown in FIG. 3. The area Ar1 is an area which contains a part of the contact portion between the injection port forming member 10 and flow path forming member 20. FIG. 4 shows the area Ar1 enlargedly in a state where the fueling nozzle FN is not inserted in the injection port forming member 10 (which is hereinafter called a "non-inserted state"). In FIG. 4, for the sake of understanding, in addition to the fueling direction D1, there are shown an inside diameter direction D2 and an outside diameter direction D3. The inside layer 21 includes a supporting projection part 210 in the boundary between the neck part 28 and pipe part 29. The supporting projection part 210 projects in the inside diameter direction D2 in the inner peripheral surface of the inside layer 21 over the whole periphery thereof along the peripheral direction. The supporting projection part 210 supports the injection port forming member 10 and prevents the injection port forming member 10 from moving greatly in the fueling direction D1. However, as described later, the injection port forming member 10 is configured such that it can be slightly displaced in the fueling direction D1. The supporting projection part 210 includes an annular base portion 211 and a leading end projection portion 212. The leading end projection portion 212 has an annular area which has a width in the radial direction (inside diameter direction D2 and outside diameter direction D3) and is exposed in the opposite direction to the fueling direction D1. On the annular base portion 211, there is arranged an impact absorbing part 15 (projecting end portion 152) (which is discussed later) of the injection port forming member 10. The leading end projection portion 212 has an annular external shape which is connected to the end of the annular base portion 211 in inside diameter direction D2 and projects in the opposite direction to the fueling direction D1. The leading end projection portion 212 prevents the impact absorbing part 15 (projecting end portion 152) (which is discussed later) from being displaced from the annular base portion 211.

A2-2. Configuration of Retainer 30:

As shown in FIGS. 2 and 3, the retainer 30 includes an outer periphery protection part 31, a connecting part 34, a seal part 32, an inner periphery protection part 33, and a caulking part 35. Here, the retainer 30 of FIG. 2 shows the retainer 30 before the caulking part 35 is formed.

As shown in FIG. 3, the retainer 30 has a substantially U-like section shape convex toward the open end face side and is arranged so as to surround the outer peripheral surface of the neck part 28, the open end surface of the neck part 28 and the inner peripheral surface of the neck part 28 continuously. As shown in FIGS. 2 and 3, the external shape of the outer periphery protection part 31 is a cylindrical shape. As shown in FIG. 3, the end of the outer periphery protection part 31 on the leading end side is connected to the caulking part 35. The outer periphery protection part 31, when the open end adjacent portion of the neck part 28 absorbs fuel and swells, pushes such portion in the inside diameter direction to thereby suppress deformation thereof.

As shown in FIGS. 2 and 3, the external shape of the connecting part 34 is an annular shape which projects in the opposite direction to the fueling direction D1. The end of the connecting part 34 on the outer periphery side is connected to the end of the outer periphery protection part 31 on the base end side. The end of the connecting part 34 on the inner periphery side is connected to the end of the seal part 31 on the base end side.

As shown in FIGS. 2 and 3, the external shape of the seal part 32 is a pot-like shape the inner peripheral diameter of which reduces along the fueling direction D1. When the fuel cap FC shown in FIG. 1 is mounted on the fuel supply apparatus 40, a gasket GS of the fuel cap FC comes into contact with the inner peripheral surface of the seal part 32, whereby the fuel flow path 20P is sealed with respect to the outside. The end of the seal part 32 on the leading end side is connected to the end of the inner periphery protection part 33 on the base end side.

As shown in FIGS. 2 and 3, the external shape of the inner periphery protection part 33 is a cylindrical shape. As shown in FIG. 3, the inner wall of the other portion of the inner periphery protection part 33 than a screw portion 331 (which is discussed below) is connected to the inner peripheral surface of the neck part 28, that is, the inner peripheral surface of the inside layer 21. The inner periphery protection part 33, when the neck part 28 absorbs fuel and swells, pushes the neck part 28 (inside layer 21) in the outside diameter direction to thereby suppress deformation thereof. The inner periphery protection part 33 includes a screw portion 331 which projects toward the inside diameter side. The screw portion 331, when the fuel cap FC is mounted onto the fuel supply apparatus 40, is screwed to a screw part FCa of the fuel cap FC shown in FIG. 1.

As shown in FIG. 3, the caulking part 35 is connected to the end of the outer periphery protection part 31 on the leading end side and is arranged over the whole periphery of the outer periphery protection part 31 in such a manner that it is positioned in the inside diameter direction as it goes toward the leading end side along the fueling direction D1. In other words, it is arranged such that it is bent in the inside diameter direction with respect to the outer periphery protection part 31; it bites from the outer peripheral surface of the outside layer 22 into the inside of the outside layer 22; and, due to bending in the inside diameter direction, it plastically deforms such portion of the outside layer 22 as exists in the vicinity of the caulking part 35, while such plastic deformation of the outside layer 22 suppresses position displacement of the caulking part 35 (retainer 30) in the fueling direction D1 or in the reversed direction thereof.

A2-3. Configuration of Injection Port Forming Member 10:

As shown in FIGS. 2 and 3, the injection port forming member 10 has an approximately funnel-like external shape, receives the fueling nozzle FN in an area surrounded by the inner periphery thereof, and guides the leading end of the fueling nozzle FN to go toward the injection port OP; and, it includes a body part 12, a held part 13, a reduced diameter part 14, and an impact absorbing part 15.

The body part 12 is situated in the central part of the injection port forming member 10 along the fueling direction D1, and has a cylindrical external shape.

The held part 13 is connected to the end of the body part 12 on the base end side, and it has a shape the inner peripheral diameter and outer peripheral diameter of which become smaller toward the fueling direction D1. As shown in FIG. 3, in a state where the injection port forming member 10 is stored in the axial hole of the flow path forming member 20, the end of the held part 13 on the base end side is in contact with the inner peripheral surface of the flow path forming member 20. In the held part 13, there are formed multiple notches arranged at given intervals along the peripheral direction. Each notch extends from the end of the held part 13 on the base end side substantially in parallel to the fueling direction D1. Due to such formation of the multiple notches, the held part 13, when the injection port forming member 10 is mounted into the flow path forming member 20, is elastically deformed to come into contact with the inner peripheral surface of the flow path forming member 20 (neck part 28). Since, in such portion of the held part 13 as has come into contact with the inner peripheral surface of the flow path forming member 20, there is generated an outside diameter direction force which is going to return from the elastic deformation, such portion is pressed against the inner peripheral surface of the neck part 28. Thus, the injection port forming member 10 (held part 13) is held by the flow path forming member 20 (neck part 28), whereby great movement thereof in the fueling direction D1 is restricted.

As shown in FIGS. 2 and 3, the reduced diameter part 14 is connected to the end of the body part 12 on the leading end side, and it has a shape the inner peripheral diameter and outer peripheral diameter of which become smaller toward the fueling direction D1. As shown in FIG. 3, in the end of the reduced diameter part 14 on the leading end side, there is formed the injection port OP. Therefore, the leading end of the fueling nozzle FN inserted into the axial hole of the injection port forming member 10 is guided to the injection port OP by the reduced diameter part 14.

As shown in FIGS. 3 and 4, the impact absorbing part 15 is connected to the substantially central portion of the body part 12 along the fueling direction D1 and has a substantially annular external shape projecting in the outside diameter direction (the outside diameter direction D3 shown in FIG. 4) over the whole periphery of such central portion along the peripheral direction. The impact absorbing part 15 has flexibility and is bent when the fueling nozzle FN strikes the injection port forming member 10, thereby enabling absorption of an impact produced by an external force applied from the fueling nozzle FN. "The impact absorbing part 15 has flexibility", in this embodiment, means that at least a projection body 151 (to be discussed later) constituting a part of the impact absorbing part 15 has flexibility. Therefore, a projection end 152 (to be discussed later) constituting a part of the impact absorbing part 15 may or may not have flexibility. Here, in this embodiment, the projection end 152 has flexibility. Also, "to have flexibility", in this embodiment, means that, when or after the fueling nozzle FN is inserted into the injection port forming member 10, elastic deformation is caused by an external force applied from the fueling nozzle FN. In this case, the external force is substantially equal to a force obtained by combining gravity given to the fueling nozzle FN and a force given by a user when pressing the fueling nozzle FN against the injection port forming member 10.

As shown in FIGS. 3 and 4, the impact absorbing part 15 includes the projection body 151 and projection end 152. The projection body 151 is connected to the outer peripheral surface of the injection port forming member 10 and projects in such outer peripheral surface in the outside diameter direction D3 over the whole periphery of such outer peripheral surface in the peripheral direction. The projection end 152 is connected to the end of the projection body 151 in the outside diameter direction D3 and projects in the fueling direction D1. As shown in FIG. 4, in the non-inserted state, the end of the projection end 152 in the fueling direction D1 is not connected to the annular base portion 211 of the supporting projection part 210 but is in contact therewith. A part of the weight of the injection port forming member 10 is transmitted through the projection end 152 to the annular base portion 211. Thus, the injection port forming member 10 is held in the held part 13 by the neck part 28 and is supported in the impact absorbing part 15 by the neck part 28 (supporting projection part 210).

Figure 5:
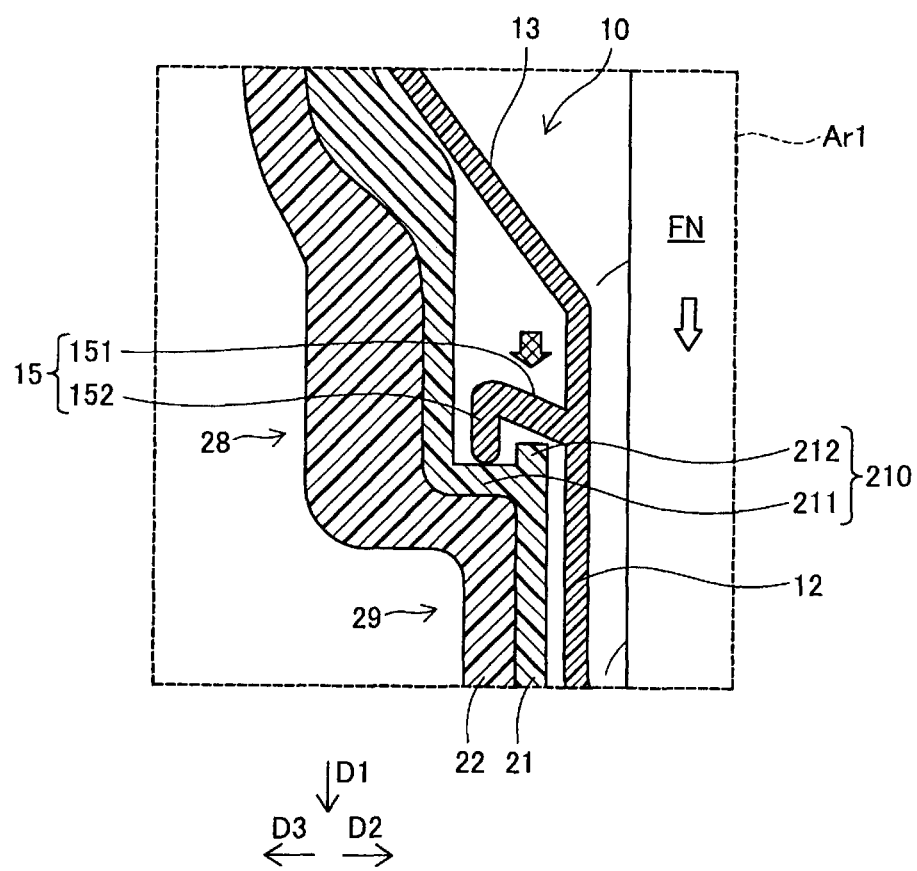
FIG. 5 is an enlarged explanatory view of the area Ar1 in an inserted state where a fueling nozzle is inserted in an injection port forming member.

FIG. 5 is an enlarged explanatory view of the area Ar1 in a state where the fueling nozzle FN is inserted into the injection port forming member 10 (which is hereinafter called "inserted state"). When the fueling nozzle FN is inserted into the injection port forming member 10, the reduced diameter part 14 or the like is pushed in the fueling direction D1 by the leading end of the fueling nozzle FN. In this case, as shown in FIG. 5, the projection body 151 of the impact absorbing part 15 is flexed and the other portion of the injection port forming member 10 than the impact absorbing part 15, as shown by hatched arrows, is moved (displaced) in the fueling direction D1 as a whole. Flection of the impact absorbing part 15 (projection body 151) absorbs an impact given by the external force in the fueling direction D1 applied from the fueling nozzle FN, thereby suppressing damage against the injection port forming member 10. In other words, when the external force in the fueling direction D1 is applied by the fueling nozzle FN, the other portion than the impact absorbing part 15, due to flection of the impact absorbing part 15 (projection body 151), is moved according to the movement of the fueling nozzle FN, while stress produced in such portion becomes small when compared with a configuration where such portion is not moved. Thus, damage against the injection port forming member 10 caused by such stress can be suppressed.

Here, in FIG. 5, the projection body 151 is not in contact with the leading end projection portion 212 of the supporting projection part 210. However, when the force applied to the injection port forming member 10 when inserting the fueling nozzle FN is larger, the projection body 151 is flexed greatly in the fueling direction D1, thereby causing the projection end 152 to come into contact with the leading end projection portion 212. In this case, any further flection of the projection body 151 is regulated, thereby regulating the movement (displacement) of the injection port forming member 10 in the fueling direction D1. Thus, the projection body 151 is restricted from flexing until it is plastically deformed, thereby enabling suppression of damage against the whole of the injection port forming member 10 including the impact absorbing part 15.

In the inserted state shown in FIG. 5, when fueling is completed and the fueling nozzle FN is removed from the injection port forming member 10, the flection of the impact absorbing part 15 is eliminated to return it to its original shape, whereby the inserted state shown in FIG. 5 is returned to the non-inserted state shown in FIG. 4. Thus, preparation for guiding the fueling nozzle FN when inserting the fueling nozzle FN next time is completed simultaneously when the fueling nozzle FN is removed from the injection port forming member 10.

According to the fuel supply apparatus 40 of the first embodiment described heretofore, even when, in insertion of the fueling nozzle FN, the fueling nozzle FN strikes the injection port forming member 10 to thereby apply an external force in a direction substantially parallel to the fueling direction D1, such external force is absorbed by the impact absorbing part 15, thereby enabling suppression of damage against the injection port forming member 10.

In addition, since the impact absorbing part 15 is arranged such that it is not connected to the supporting projection part 210 (annular base portion 211), when compared with a configuration in which the impact absorbing part 15 and supporting projection part 210 are connected to each other, the impact absorbed by the impact absorbing part 15 is prevented from being transmitted to the flow path forming member 20 through the supporting projection part 210, thereby enabling suppression of damage against the flow path forming member 20.

Also, since the impact absorbing part 15 (projection end 152) is arranged such that it is not connected to the supporting projection part 210 (annular base portion 211), when compared with a configuration in which the impact absorbing part 15 projection end 152) and supporting projection part 210 (annular base portion 211) are connected to each other, the fuel supply apparatus 40 can be manufactured easily.

A3. Modification of First Embodiment

Figure 6:
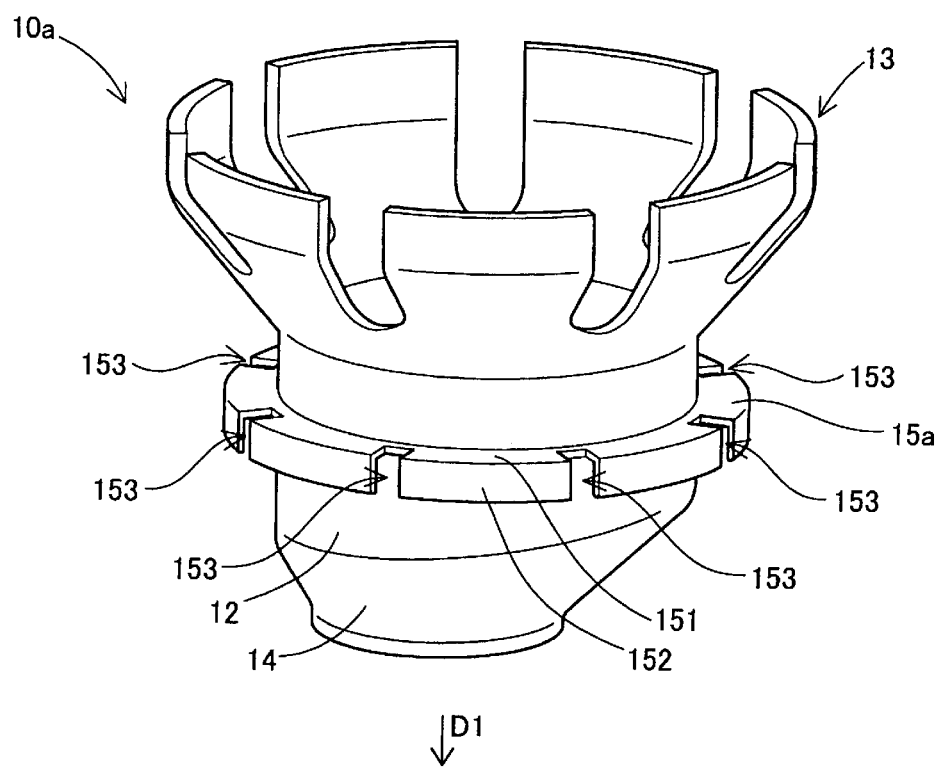
FIG. 6 is a perspective view of the external configuration of an injection port forming member used in a fuel supply apparatus according to a first example of the modification of the first embodiment.

FIG. 6 is a perspective view of the external configuration of an injection port forming member 10a used in a fuel supply apparatus according to a first example of the modification of the first embodiment. A fuel supply apparatus of the first example of the modification of the first embodiment is different from the above fuel supply apparatus 40 of the first embodiment in that it includes an injection port forming member 10a instead of the injection port forming member 10. The injection port forming member 10a is different from the injection port forming member 10 of the first embodiment in that it includes an impact absorbing part 15a instead of the impact absorbing part 15. Since the remaining configurations of the injection port forming member 10a are the same as the injection port forming member 10 of the first embodiment, the same composing elements are given the same designations and thus the detailed description thereof is omitted.

The impact absorbing part 15a of the first example of the modification of the first embodiment is different from the impact absorbing part 15 of the first embodiment in that it includes multiple notches 153. Since the remaining composing elements of the impact absorbing part 15a of the first example of the modification of the first embodiment are the same as the impact absorbing part 15 of the first embodiment, the same composing elements are given the same designations and thus the detailed description thereof is omitted.

As shown in FIG. 6, the multiple notches 153 are arranged at given intervals along the peripheral direction. Each notch 153 is formed to extend over the projection body 151 and projection end 152. Since the multiple notches 153 are formed in this manner, the rigidity of the impact absorbing part 15a is lower than that of the impact absorbing part 15 of the first embodiment, thereby enabling the impact absorbing part 15a to be flexed more greatly. Thus, it can absorb the impact more greatly than the impact absorbing part 15 of the first embodiment. In addition, the fuel supply apparatus of the first example of the modification of the first embodiment has similar effects to the fuel supply apparatus 40 of the first embodiment.

Figure 7:
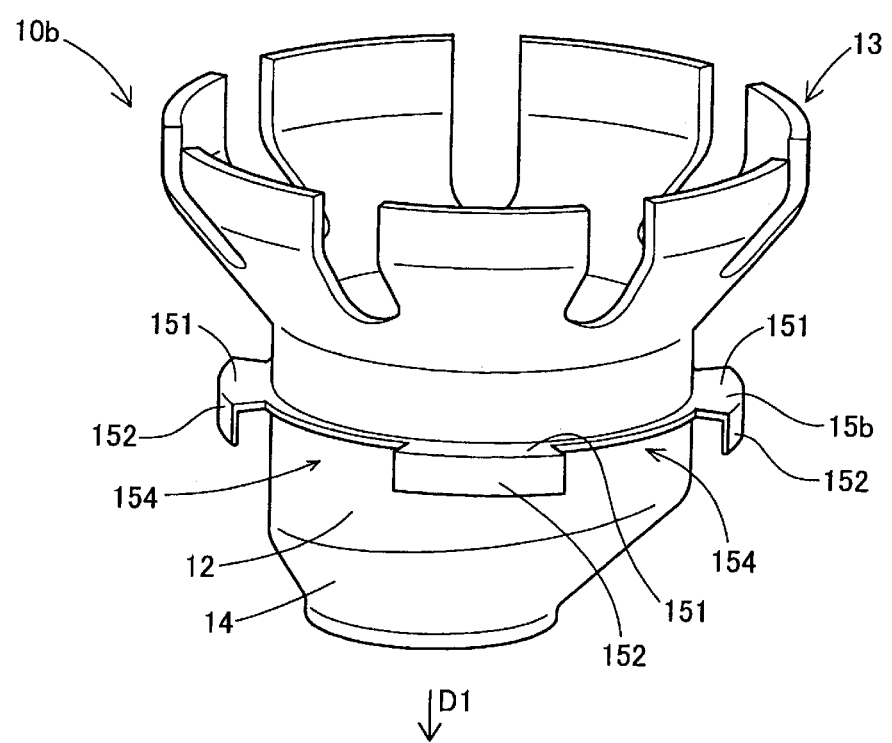
FIG. 7 is a perspective view of the external configuration of an injection port forming member used in a fuel supply apparatus according to a second example of the modification of the first embodiment.

FIG. 7 is a perspective view of the external configuration of an injection port forming member 10b used in a fuel supply apparatus according to a second example of the modification of the first embodiment. The injection port forming member 10b of the second example of the modification of the first embodiment is different from the injection port forming member 10a of the first example of the modification of the first embodiment shown in FIG. 6 in that it includes an impact absorbing part 15b instead of the impact absorbing part 15a. Since the remaining configurations of the injection port forming member 10b are the same as the injection port forming member 10a, the same composing elements are given the same designations and thus the detailed description thereof is omitted.

As shown in FIG. 7, the impact absorbing part 15*b* is different from the impact absorbing part 15*a* in that the respective notches 154 are larger in size than the notches 153. Since the remaining composing elements of the impact absorbing part 15*b* are the same as the impact absorbing part 15*a*, the same composing elements are given the same designations and thus the detailed description thereof is omitted. As shown in FIG. 7, each notch 154 has a size corresponding to about ⅛ of the entire periphery of the impact absorbing part 15*b*. In other words, the injection port forming member 10*b* has a configuration in which, in the substantially central portion of the body part 12 in the fueling direction D1, multiple impact absorbing parts each constituted of a projection body 151 and a projection end 152 are arranged at 45° intervals. The fuel supply apparatus including the injection port forming member 10*b* having such configuration has similar effects to the fuel supply apparatus of the first example of the modification of the first embodiment.

B. Second Embodiment

B1. Configuration of Injection Port Forming Member

Figure 8:
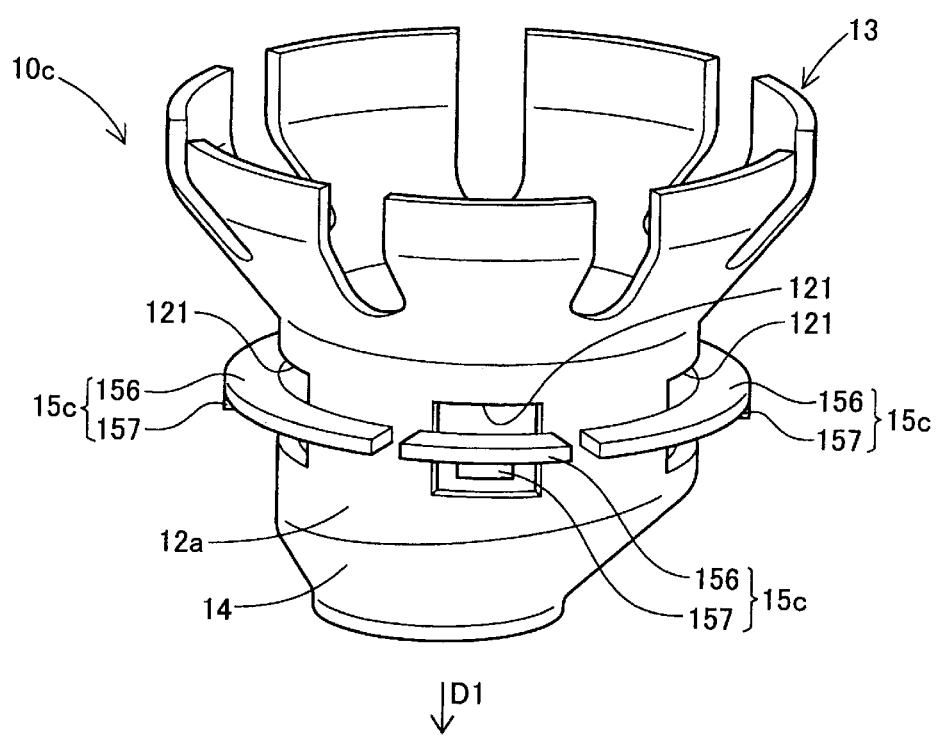
FIG. 8 is a perspective view of the external configuration of an injection port forming member used in a fuel supply apparatus according to a second embodiment.

FIG. 8 is a perspective view of the external configuration of an injection port forming member 10*c* used in a fuel supply apparatus according to a second embodiment.

The fuel supply apparatus of the second embodiment is different from the fuel supply apparatus 40 of the first embodiment in that it includes the injection port forming member 10*c* instead of the injection port forming member 10. The injection port forming member 10*c* is different from the injection port forming member 10 of the first embodiment in that it includes multiple impact absorbing parts 15*c* instead of the impact absorbing part 15 and a body part 12*a* instead of the body part 12. Since the remaining configurations of the injection port forming member 10*c* are the same as the injection port forming member 10 of the first embodiment, the same composing elements are given the same designations and thus the detailed description thereof is omitted.

In the injection port forming member 10*c* of the second embodiment, the body part 12*a* is different from the body part 12 of the first embodiment in that it includes multiple penetration holes 121. The penetration holes 121 are arranged at given intervals along the peripheral direction substantially in the central portion of the body part 12*a* along the fueling direction D1. Each penetration hole 121 has a rectangular shape in a plan view thereof and penetrates through the body part 12*a* in the thickness direction (radial direction).

The multiple impact absorbing parts 15*c* have the same configurations and are arranged at positions corresponding to their respective penetration holes 121. Each impact absorbing part 15*c* includes a beam portion 156 and a seating portion 157. The beam portion 156 has flexibility, has a thin plate-like external shape, and is arranged to straddle the substantially central portion of the penetration hole 121 (in the fueling direction D1) in a direction perpendicular to the fueling direction D1. The two ends of the beam portion 156 are connected to the outer peripheral surface of the body part 12*a*. The central portion of the beam portion 156 is not supported because it faces the penetration hole 121, and is thereby capable of flexing in a direction along the fueling direction D1. The seating portion 157 has a rectangular parallelepiped external shape, is in contact with the neck part 28 as described later, and is connected to the substantially central portion of the leading end side surface of the beam portion 156 along the fueling direction D1.

Figure 9:
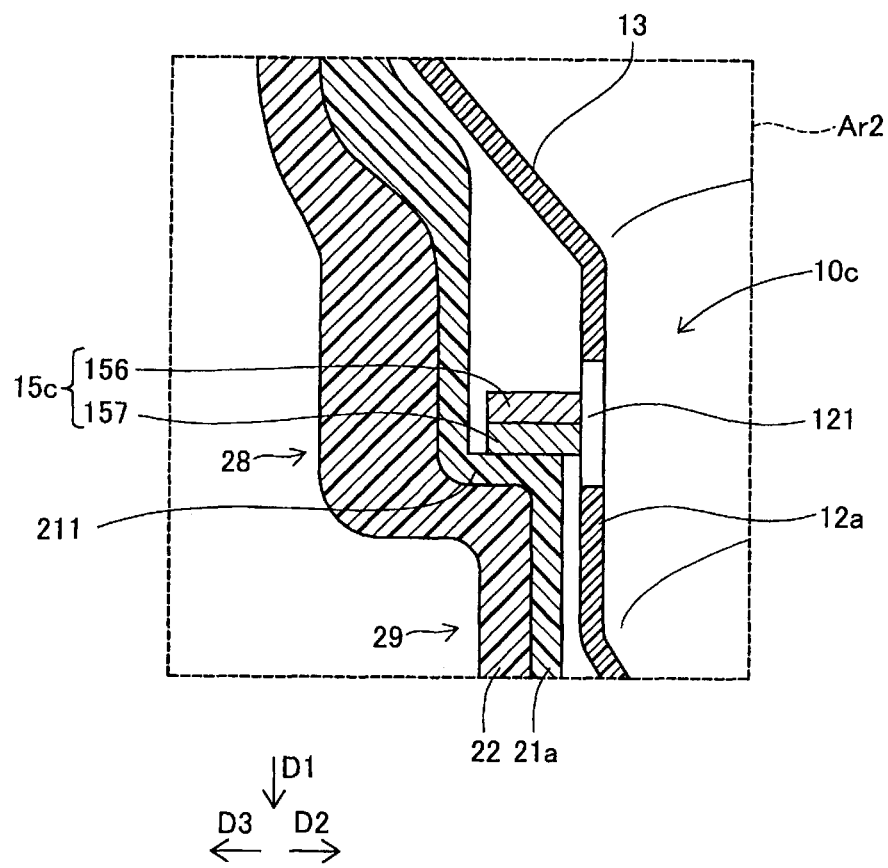
FIG. 9 is an enlarged perspective view of an area including a part of the contact portion between the injection port forming member and a flow path forming member in the fuel supply apparatus of the second embodiment.

FIG. 9 is an enlarged perspective view of an area including a part of the contact portion between the injection port forming member 10*c* and a flow path forming member 20 in the fuel supply apparatus of the second embodiment. In FIG. 9, similarly to FIG. 4, there is shown an area Ar2 existing at a similar position to the area Ar1 shown in FIG. 3, and there is also enlargedly shown the area Ar2 in the non-inserted state.

As shown in FIG. 9, an inside layer 21*a* of the second embodiment is different from the inside layer 21 of the first embodiment in that it does not include the leading end projection portion 212. As shown in FIG. 9, the length of the seating portion 157 in the radial direction coincides with the length of the beam portion 156 in the radial direction. The end of the seating portion 157 in the outside diameter direction D3 is arranged in the opposite direction to the exposed surface (the surface on the opposite side to the fueling direction D1) of the annular base portion 211. Thus, since the impact absorbing part 15*c* (seating portion 157) is arranged in the annular base portion 211, the injection port forming member 10*c* is supported.

Figure 10:
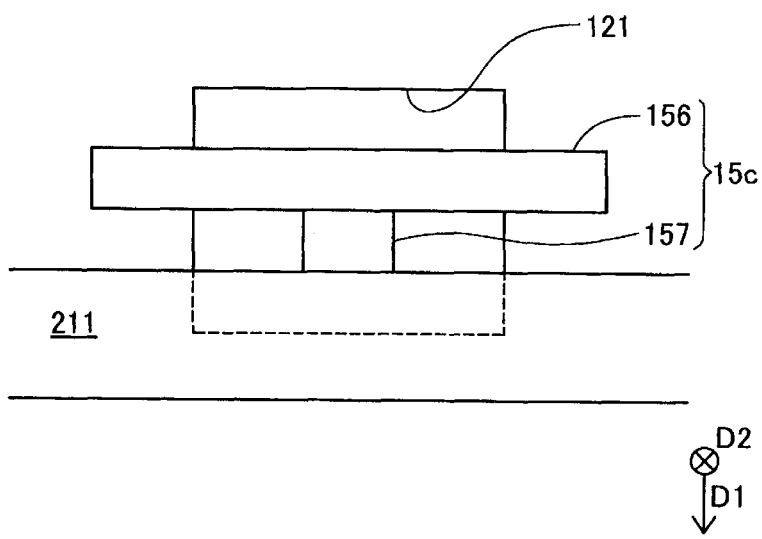
FIG. 10 is an explanatory view of a penetration hole and an impact absorbing part according to the second embodiment when viewed in the inside diameter direction in a non-inserted state where the fueling nozzle is not inserted in the injection port forming member.

FIG. 10 is an explanatory view of the penetration hole 121 and impact absorbing part 15*c* when viewed in the inside diameter direction D2 in the non-inserted state of the second embodiment. In FIG. 10, the outside layer 22 and the other portions of the inside layer 21*a* than the annular base portion 211 are omitted. Here, in FIG. 10, for convenience of illustration, hatching is omitted.

Figure 11:
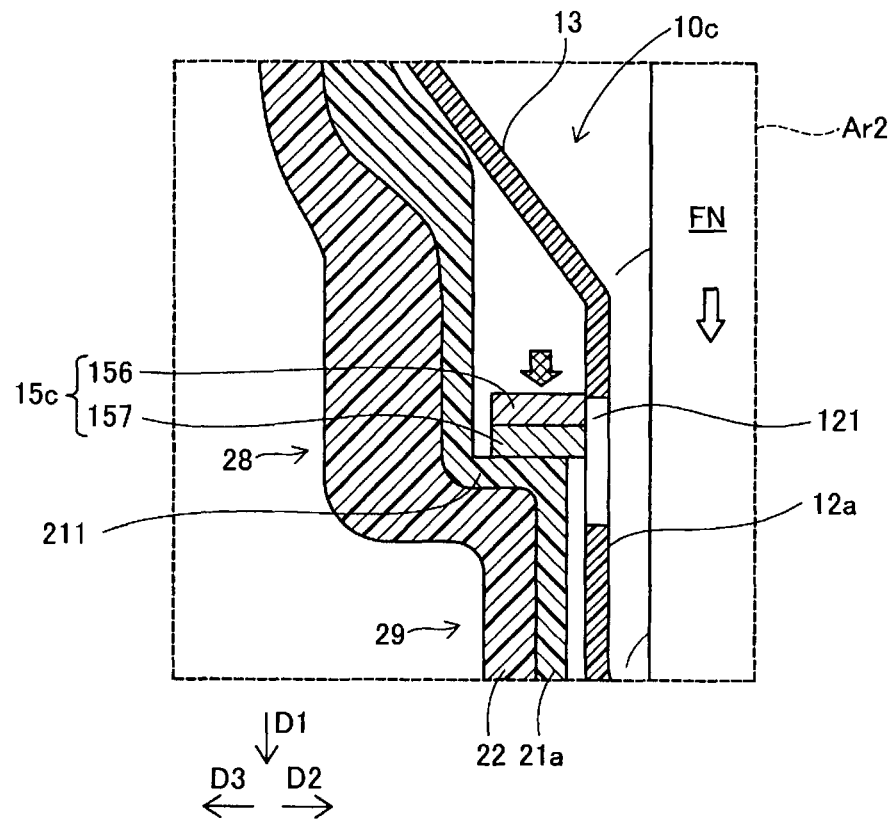
FIG. 11 is an enlarged explanatory view of an area Ar2 in the inserted state of the second embodiment.
Figure 12:
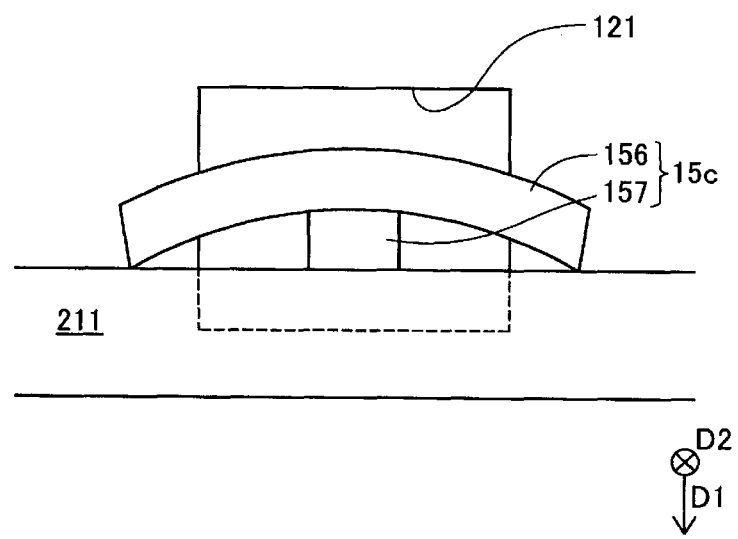
FIG. 12 is an explanatory view of the penetration hole and impact absorbing part when viewed in the inside diameter direction in the inserted state of the second embodiment.

FIG. 11 is an enlarged explanatory view of the area Ar2 in the inserted state of the second embodiment. FIG. 12 is an explanatory view of the penetration hole 121 and impact absorbing part 15*c* when viewed in the inside diameter direction D2 in the inserted state of the second embodiment. As shown in FIG. 11, when the fueling nozzle FN is inserted into the injection port forming member 10*c*, the reduced diameter part 14 and the like are pushed in the fueling direction D1 by the leading end of the fueling nozzle FN. At this time, the impact absorbing part 15*c* is also going to move in the fueling direction D1. However, since the seating portion 157 is in contact with the annular base portion 211, the movement thereof in the fueling direction D1 is regulated. In addition, since the beam portion 156 has flexibility, as shown in FIG. 12, the central portion of the beam portion 156 is flexed in the opposite direction to the fueling direction D1, whereby such central portion and seating portion 157 maintain substantially the same positions as the positions in the non-inserted state. Meanwhile, the other portions of the impact absorbing part 15*c* than the central portion of the beam portion 156 and seating portion 157 are moved (displaced) in the fueling direction D1 as a whole. In this embodiment as well, the flection of the impact absorbing part 15*c* (beam portion 156) absorbs an impact due to the external force in the fueling direction D1 applied from the fueling nozzle FN, thereby enabling suppression of damage against the injection port forming member 10.

The fuel supply apparatus of the second embodiment having the above configuration provides similar effects to the fuel supply apparatus 40 of the first embodiment. In addition, since the penetration holes 121 are formed in the body part 12*a* and the beam portions 156 are arranged so as to straddle their respective penetration holes 121, the central portions of the beam portions 156 can be flexed greatly, thereby enabling great absorption of the impact given by the external force in the fueling direction D1 applied from the fueling nozzle FN.

B2. Modification of Second Embodiment

Figure 13:
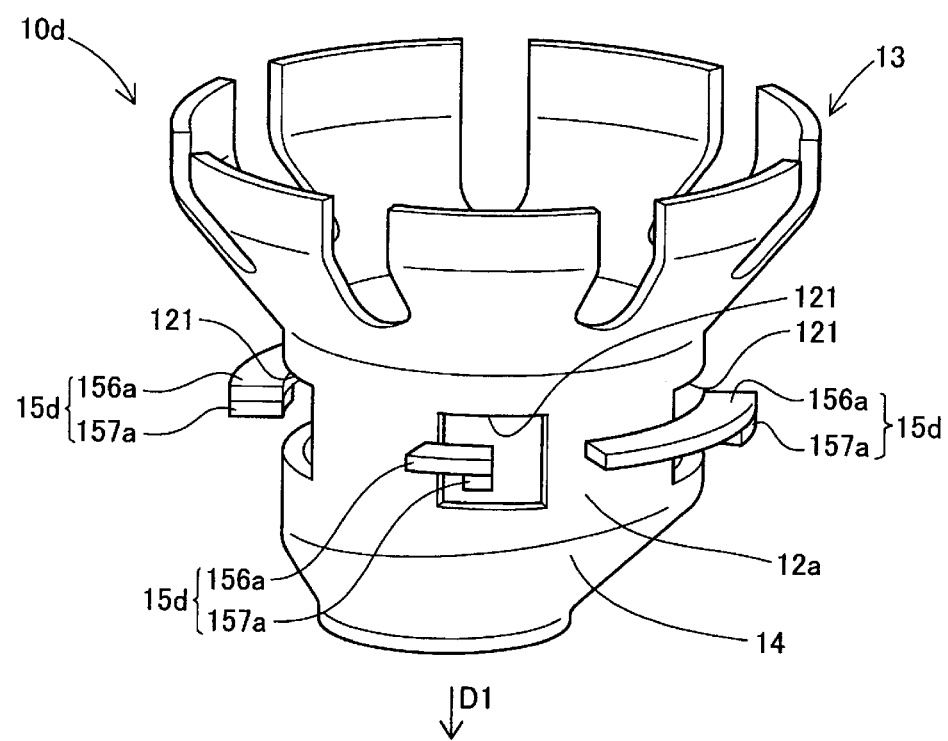
FIG. 13 is a perspective view of the external shape of an injection port forming member according to a modification of the second embodiment.

FIG. 13 is a perspective view of the external shape of an injection port forming member 10d according to a modification of the second embodiment. The injection port forming member 10d is different from the injection port forming member 10c of the second embodiment in the configuration of the impact absorbing part, while the remaining composing elements thereof are the same as the injection port forming member 10c. An impact absorbing part 15d included in the injection port forming member 10d, when viewed in the inside diameter direction, has a configuration corresponding to the left half of the impact absorbing part 15c of the injection port forming member 10c along the peripheral direction. Specifically, a beam portion 156a included in the impact absorbing part 15d corresponds to the left half of the beam portion 156 of the impact absorbing part 15c shown in FIG. 8. Thus, only the left side end portion of the beam portion 156a is connected to the body part 12a. In other words, since the other portions of the beam portion 156a than the left side end portion exist in portions corresponding to the penetration holes 121, they are not supported by the body part 12a. A seating portion 157a of the impact absorbing part 15d corresponds to the left half of the seating portion 157 of the impact absorbing part 15c shown in FIG. 8. The fuel supply apparatus of the modification of the second embodiment having the above configuration has similar effects to the fuel supply apparatus of the second embodiment. In addition, in the impact absorbing part 15d, the beam portion 156a is easy to flex because it is supported by the body part 12a only in the left side end portion thereof. Thus, an impact caused by the insertion of the fueling nozzle FN can be absorbed more greatly.

C. Third Embodiment

Figure 14:
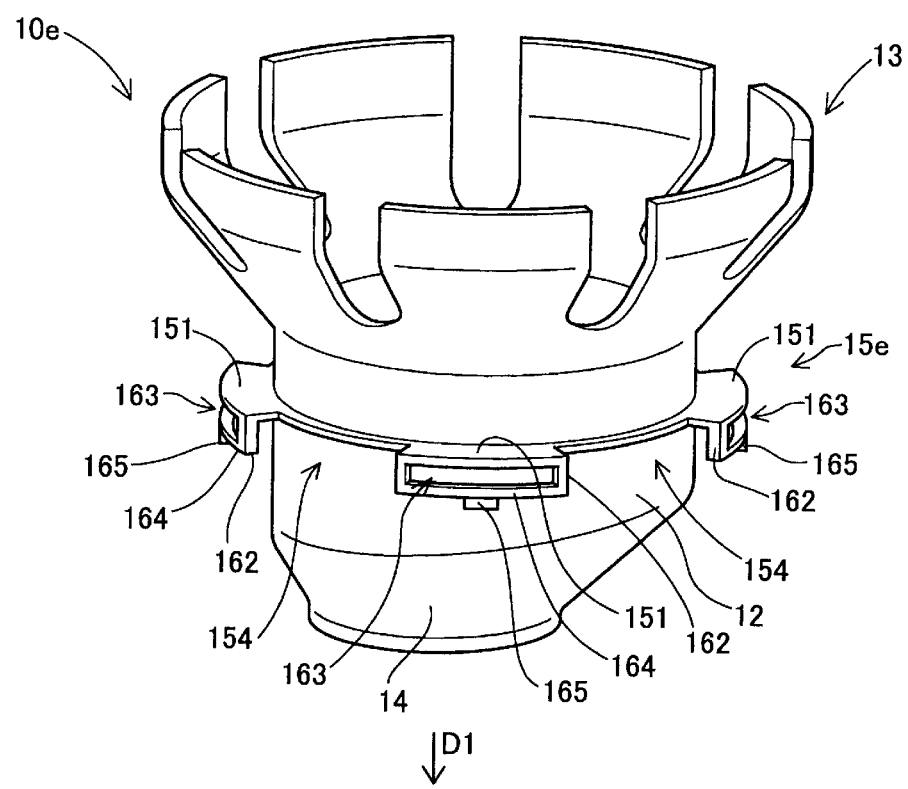
FIG. 14 is a perspective view of the external configuration of an injection port forming member used in a fuel supply apparatus according to a third embodiment.

FIG. 14 is a perspective view of the external configuration of an injection port forming member 10e used in a fuel supply apparatus according to a third embodiment. The fuel supply apparatus of the third embodiment is different from the fuel supply apparatus 40 of the first embodiment in that it includes the injection port forming member 10e instead of the injection port forming member 10, and also in the specific configuration of the inside layer. The injection port forming member 10e is different from the injection port forming member 10b of the first example of the modification of the first embodiment shown in FIG. 7 in that it includes an impact absorbing part 15e instead of the impact absorbing part 15b. Since the remaining configurations of the injection port forming member 10e are the same as the injection port forming member 10b, the same composing elements are given the same designations and thus the detailed description thereof is omitted.

The impact absorbing part 15e is different from the impact absorbing part 15b shown in FIG. 7 in that it includes an opening forming portion 162 and a seating portion 165 instead of the projection end 152. Since the remaining composing elements of the impact absorbing part 15e are the same as the impact absorbing part 15b, the same composing elements are given the same designations and thus the detailed description thereof is omitted.

The opening forming portion 162 extends along the fueling direction D1 from the end of the projection body 151 in the outside diameter direction and includes in the central portion thereof a penetration hole 163 having a rectangular shape in its plan view. In this embodiment, the opening forming portion 162 has flexibility and, for example, may be formed by integral molding using the same kind of resin as the projection body 151. A columnar portion 164 situated in the leading end of the opening forming portion 162 extends along the peripheral direction, while only the two ends thereof are connected to the projection body 151. The seating portion 165 is connected to the substantially central portion of the leading end side surface of the columnar portion 164 along the peripheral direction. The seating portion 165 has a similar function to the seating portion 157 of the impact absorbing part 15c shown in FIG. 8, and thus the detained description thereof is omitted.

The inside layer of the third embodiment is the same as the inside layer 21a of the second embodiment shown in FIG. 9, and thus the detained description thereof is omitted. The seating portion 165 of the impact absorbing part 15e is arranged on the annular base portion 211 shown in FIG. 9.

Figure 15:
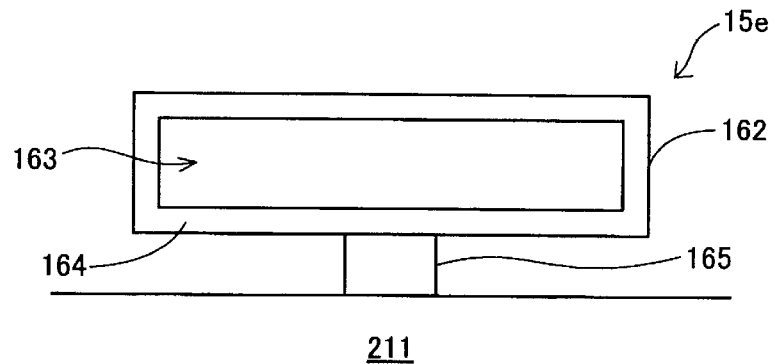
FIG. 15 is an explanatory view of an impact absorbing part and an annular base portion when viewed in the inside diameter direction in the non-inserted state of the third embodiment.

FIG. 15 is an explanatory view of the impact absorbing part 15e and annular base portion 211 when viewed from the inside diameter direction D2 in the non-inserted state of the third embodiment. In FIG. 15, similarly to FIG. 10, the outside layer 22 and the other portion of the inside layer 21a than the annular base portion 211 are omitted. Here, in FIG. 15, for convenience of illustration, hatching is omitted. In the non-inserted state, no deformation has occurred in the opening forming portion 162.

Figure 16:
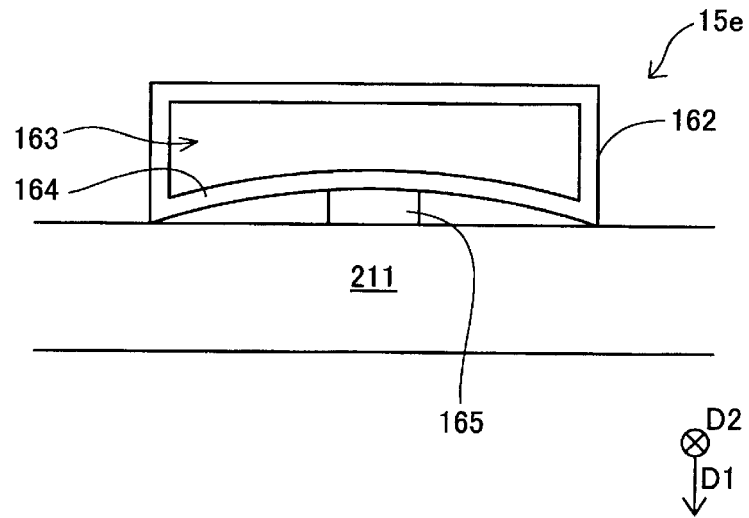
FIG. 16 is an explanatory view of the impact absorbing part and annular base portion when viewed in the inside diameter direction in the inserted state of the third embodiment.

FIG. 16 is an explanatory view of the impact absorbing part 15e and annular base portion 211 when viewed from the inside diameter direction D2 in the inserted state of the third embodiment. When the fueling nozzle FN is inserted into the injection port forming member 10e, the reduced diameter part 14 and the like are pressed in the fueling direction D1 by the leading end of the fueling nozzle FN. In this case, the impact absorbing part 15e is also going to move in the fueling direction D1. However, since the seating portion 165 is in contact with the annular base portion 211, the movement thereof in the fueling direction D1 is regulated. In addition, since the columnar portion 164 has flexibility, as shown in FIG. 16, the central portion of the columnar portion 164 is flexed in the opposite direction to the fueling direction D1, whereby such portion and seating portion 165 maintain substantially the same positions as those in the non-inserted state. Meanwhile, the other portions of the impact absorbing part 15e than the central portion of the columnar portion 164 and seating portion 165 are allowed to move (displace) in the fueling direction D1 as a whole. In this embodiment as well, the flexion of the impact absorbing part 15e (columnar portion 164) absorbs an impact given by the external force in the fueling direction D1 applied from the fueling nozzle FN, thereby enabling suppression of damage against the injection port forming member 10e.

The fuel supply apparatus of the third embodiment having the above configuration provides similar effects to the fuel supply apparatus 40 of the first embodiment. In addition, since the seating portion 164 in contact with the annular base portion 211 is connected to the central portion of the columnar portion 164 supported only in the two ends thereof, when inserting the fueling nozzle FN, the central portion of the columnar portion 164 can be flexed greatly, whereby an impact given by the external force in the fueling direction D1 applied from the fueling nozzle FN can be absorbed greatly.

D. Fourth Embodiment

In the above-mentioned first to third embodiments and their respective modifications, the injection port forming members 10, 10*a*~10*e* include the impact absorbing parts 15, 15*a*~15*e*, respectively. In the present embodiment and a fifth embodiment (to be discussed later), a flow path forming member includes an impact absorbing part.

Figure 17:
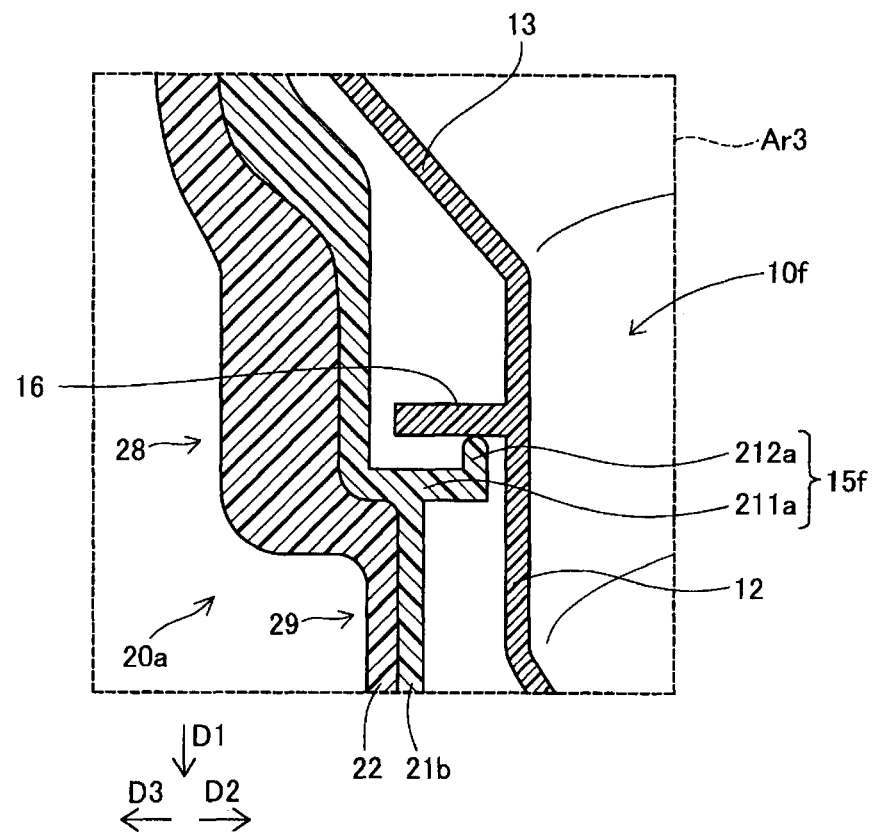
FIG. 17 is an enlarged perspective view of an area including a part of the contact portion between an injection port forming member and a flow path forming member in a fuel supply apparatus according to a fourth embodiment.

FIG. 17 is an enlarged perspective view of an area including a part of the contact portion between an injection port forming member 10*f* and a flow path forming member 20*a* in a fuel supply apparatus according to a fourth embodiment. FIG. 17, similarly to FIG. 4, shows enlargedly an area Ar3 in the non-inserted state which exists at a similar position to the position of the area Ar1 shown in FIG. 3.

The flow path forming member 20*a* of the fourth embodiment is different from the flow path forming member 20 of the first embodiment in that it includes an impact absorbing part 15*f* instead of the supporting projection part 210. Since the remaining composing elements of the flow path forming member 20*a* are the same as the flow path forming member 20 of the first embodiment, the same composing elements are given the same designations and thus the detailed description thereof is omitted.

The impact absorbing part 15*f* has a similar external shape to the supporting projection part 210 of the first embodiment, includes an annular base portion 211*a* and a leading end projection portion 212*a*, and, in this embodiment, has flexibility similarly to the impact absorbing part 15 of the first embodiment. The annular base portion 211*a* is different from the annular base portion 211 of the first embodiment in that it has greater flexibility than the annular base portion 211, while the other configurations thereof are the same as the annular base portion 211. For example, by forming the annular base portion 211*a* thinner than the annular base portion 211, greater flexibility may be realized. Similarly, the leading end projection portion 212*a* is different from the leading end projection portion 212 of the first embodiment in that it has greater flexibility than the leading end projection portion 212, while the other configurations thereof are the same as the leading end projection portion 212.

The injection port forming member 10*f* of the fourth embodiment is different from the injection port forming member 10 of the first embodiment in that it includes a supported projection part 16 instead of the impact absorbing part 15. Since the remaining composing elements of the injection port forming member 10*f* are same as the injection port forming member 10 of the first embodiment, the same composing elements are given the same designations and thus the description thereof is omitted.

The supported projection part 16 is similar in the external shape to a configuration in which the projection end portion 152 is omitted in the impact absorbing part 15 of the first embodiment shown in FIG. 4. However, the supported projection part 16 has smaller flexibility than the impact absorbing part 15 (projection body 151). The supported projection part 16 is connected to the outer peripheral surface of the body part 12 of the injection port forming member 10*f* and projects in this outer peripheral surface over the whole periphery thereof along the peripheral direction thereof in the outside diameter direction D3. The surface (surface opposed to the impact absorbing part 15*f*) of the supported projection part 16 in the peripheral direction is in contact with the end of the leading end projection portion 212*a* on the base end side. In other words, since the supported projection part 16 is in contact with the leading end projection portion 212*a*, the injection port forming member 10*f* is supported by the flow path forming member 20*a*.

Figure 18:
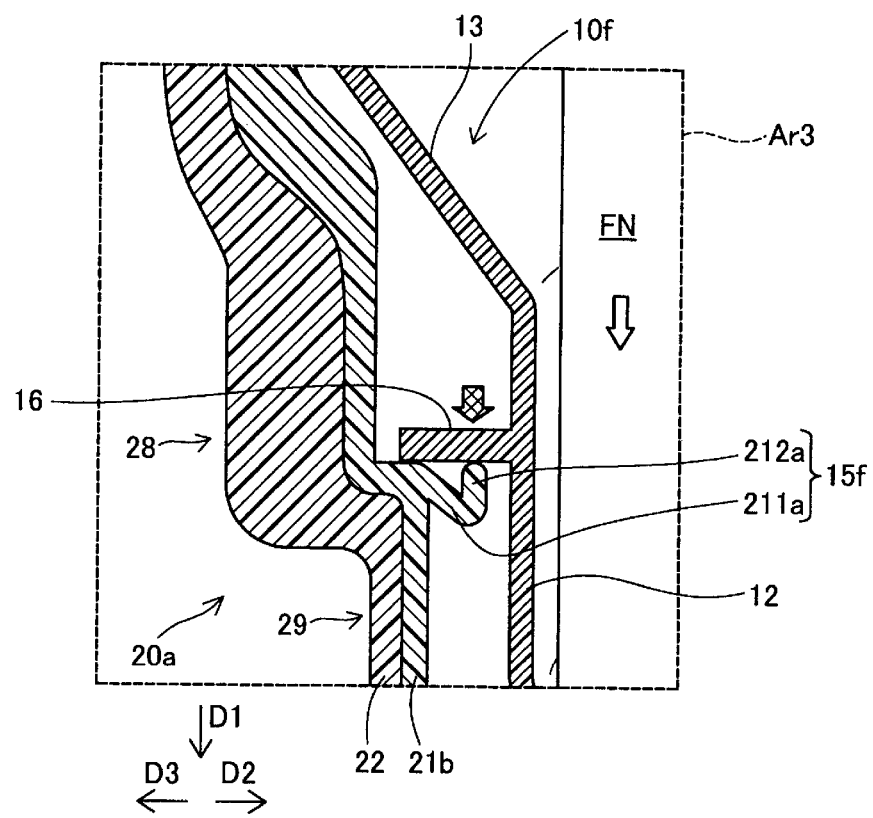
FIG. 18 is an enlarged explanatory view of an area Ar3 in the inserted state of the fourth embodiment.

FIG. 18 is an enlarged explanatory view of the area Ar3 in the inserted state of the fourth embodiment. When the fueling nozzle FN is inserted into the injection port forming member 10*f*, the reduced diameter part and the like are pressed in the fueling direction D1 by the leading end portion of the fueling nozzle FN. In this case, as shown in FIG. 18, the annular base portion 211*a* of the impact absorbing part 15*f* is flexed in the fueling direction D1, and the injection port forming member 10*f* is moved (displaced) in the fueling direction D1 as a whole. Thus, in the fourth embodiment as well, the impact absorbing part 15*f* (annular base portion 211*a*) is flexed to thereby absorb an impact given by the external force in the fueling direction D1 applied from the fueling nozzle FN, thereby enabling suppression of damage against the injection port forming member 10*f*.

The above-mentioned fuel supply apparatus of the fourth embodiment has similar effects to the fuel supply apparatus 40 of the first embodiment.

E. Fifth Embodiment

Figure 19:
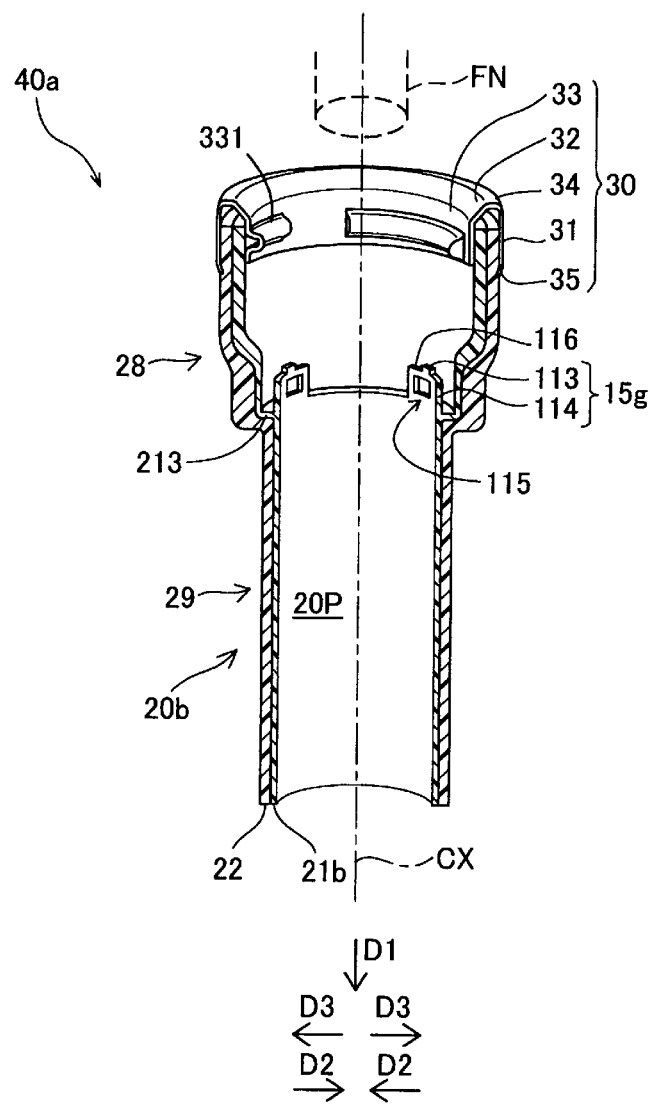
FIG. 19 is a broken perspective view of a fuel supply apparatus according to a fifth embodiment.

FIG. 19 is a broken perspective view of a fuel supply apparatus 40*a* according to a fifth embodiment. The fuel supply apparatus 40*a* of the fifth embodiment is different from the fuel supply apparatus 40 of the first embodiment in the specific configuration of the injection port forming member and in the specific configuration of the flow path forming member. Since the remaining configurations of the fuel supply apparatus 40*a* of the fifth embodiment are the same as the fuel supply apparatus 40, the same composing elements are given the same designations and thus the detailed description thereof is omitted.

The injection port forming member of the fifth embodiment has the same configuration as the injection port forming member 10*f* of the fourth embodiment and thus the detailed description thereof is omitted. Here, in FIG. 5, for convenience of illustration, the injection port forming member is omitted.

The flow path forming member 20*b* of the fifth embodiment includes an inside layer 21*b* instead of the inside layer 21. The inside layer 21*b* includes, in the boundary between the neck part 28 and pipe part 29, an annular base part 213 and multiple impact absorbing parts 15*g*. The annular base part 213 has an annular area the width of which extends in the radial direction and which is exposed in the opposite direction to the fueling direction D1.

The multiple impact absorbing parts 15*g* are arranged at given intervals along the peripheral direction in the end portion of the annular base part 213 in the inside diameter direction D2 and project in the opposite direction to the fueling direction D1 respectively. Each impact absorbing part 15*g* has a configuration similar to a configuration in which the opening forming portions 162 and seating portions 165 of the third embodiment shown in FIG. 15 are reversed in the fueling direction D1. Each impact absorbing part 15*g* includes an opening forming portion 114 and a seating portion 113. The opening forming portion 114 extends along a direction opposite to the fueling direction D1 from the end of the annular base part 213 in the inside diameter direction and includes a penetration hole 115 which is formed in the central portion thereof and has a rectangular shape in its plan view. In this embodiment, the opening forming portion 114 has flexibility. A columnar portion 116 disposed in the end of the opening forming portion 114 on the base end side extends along the peripheral direction and, only in the two ends thereof, is connected to the annular base portion 213. The seating portion 113 is connected to the substantially central portion of the base end side surface of the columnar portion 116 along the peripheral direction. The seating portion 113 has a similar function to the seating portion 165 of the impact absorbing part 15e shown in FIG. 15 and thus the detailed description thereof is omitted.

Figure 20:
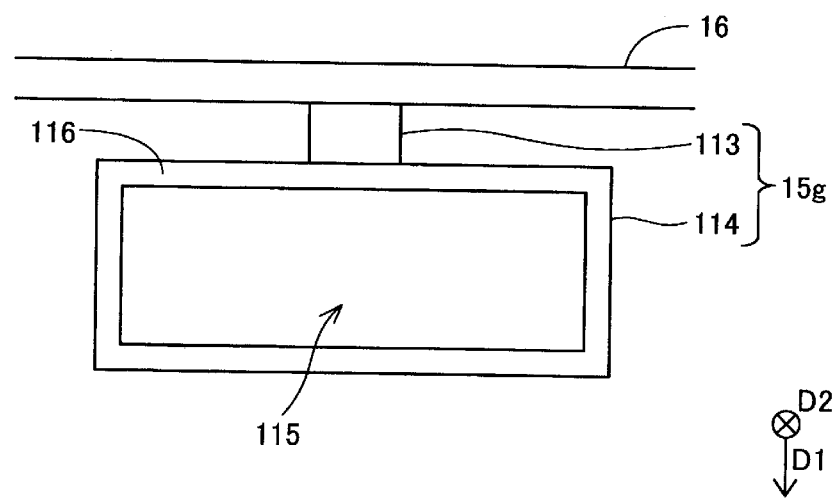
FIG. 20 is an explanatory view of an impact absorbing part and a supported projection part when viewed in the inside diameter direction in the non-inserted state of the fifth embodiment.

FIG. 20 is an explanatory view of the impact absorbing part 15g and supported projection part 16 when viewed in the inside diameter direction D2 in the non-inserted state of the fifth embodiment. In FIG. 20, similarly to FIG. 10, the outside layer 22 and the other portions of the inside layer 21b than the annular base portion 213 are omitted. Here, in FIG. 20, for convenience of illustration, hatching is omitted. In the non-inserted state, no deformation has occurred in the opening forming portion 114.

Figure 21:
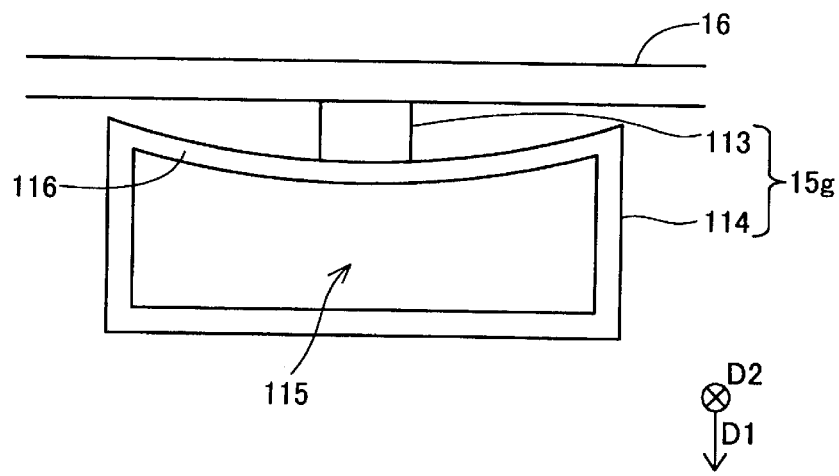
FIG. 21 is an explanatory view of an impact absorbing part and a supported projection part when viewed in the inside diameter direction in the inserted state of the fifth embodiment.

FIG. 21 is an explanatory view of the impact absorbing part 15g and supported projection part 16 when viewed in the inside diameter direction D2 in the inserted state of the fifth embodiment. When the fueling nozzle FN is inserted into the injection port forming member 10f, the reduced diameter part 14 and the like are pressed in the fueling direction D1 by the leading end of the fueling nozzle FN. At this time, as shown in FIG. 21, a columnar portion 116 of the impact absorbing part 15g receives an external force from the supported projection part 16 through the seating portion 113 and is thereby flexed in the fueling direction D1. Therefore, the injection port forming member 10f including the supported projection part 16 is moved (displaced) in the fueling direction D1 as a whole. Thus, in the fifth embodiment as well, the impact absorbing part 15g (columnar portion 116) is flexed to thereby absorb an impact given by the external force in the fueling direction D1 applied from the fueling nozzle FN, thereby enabling suppression of damage against the injection port forming member 10f.

F. Sixth Embodiment

In the above-mentioned first to fifth embodiments and their respective modifications, the impact absorbing parts 15, 15a~15g absorb mainly an impact given by the external force in the fueling direction D1 applied from the fueling nozzle FN when the fueling nozzle FN is inserted. In this embodiment and a seventh embodiment (to be discussed later), after insertion of the fueling nozzle FN, during fueling, an impact given by the external force in a direction intersecting with the fueling direction D1 applied from the fueling nozzle FN is mainly absorbed.

Figure 22:
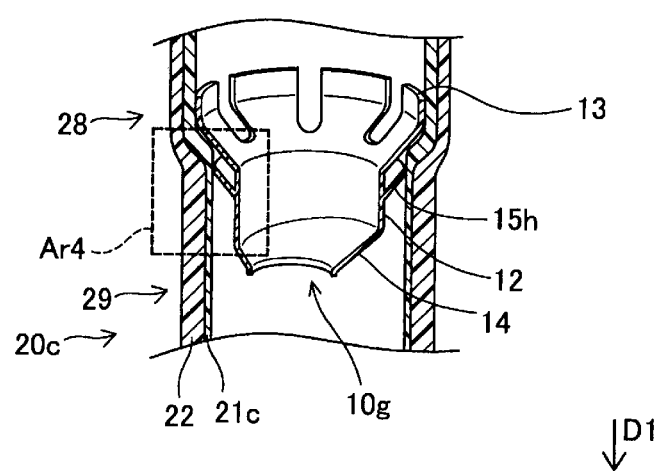
FIG. 22 is a broken perspective view of a part of a fuel supply apparatus according to a sixth embodiment.

FIG. 22 is a broken perspective view of a part of a fuel supply apparatus according to a sixth embodiment. In FIG. 22, for convenience of illustration, there is shown only the area centered on the position where the injection port forming member 10g is mounted. The fuel supply apparatus of the sixth embodiment is different from the fuel supply apparatus 40 of the first embodiment in the specific configuration of the flow path forming member and in the specific configuration of the injection port forming member. Since the remaining configurations of the fuel supply apparatus of the sixth embodiment are the same as the fuel supply apparatus 40, the same composing elements are given the same designations and thus the detailed description thereof is omitted.

The flow path forming member 20c of the sixth embodiment is different from the flow path forming member 20 of the first embodiment in that it includes an inside layer 21c instead of the inside layer 21. Since the remaining configurations of the flow path forming member 20c of the sixth embodiment are the same as the flow path forming member 20 of the first embodiment, the same composing elements are given the same designations and thus the detailed description thereof is omitted. The inside layer 21c of the sixth embodiment is different from the inside layer 21 of the first embodiment in that it does not include the supporting projection portion 210.

The injection port forming member 10g of the sixth embodiment is different from the injection port forming member 10 of the first embodiment in that it includes an impact absorbing part 15h instead of the impact absorbing part 15. Since the remaining composing elements of the injection port forming member 10g of the sixth embodiment are the same as the injection port forming member 10 of the first embodiment, the same composing elements are given the same designations and thus the detailed description thereof is omitted.

Figure 23:
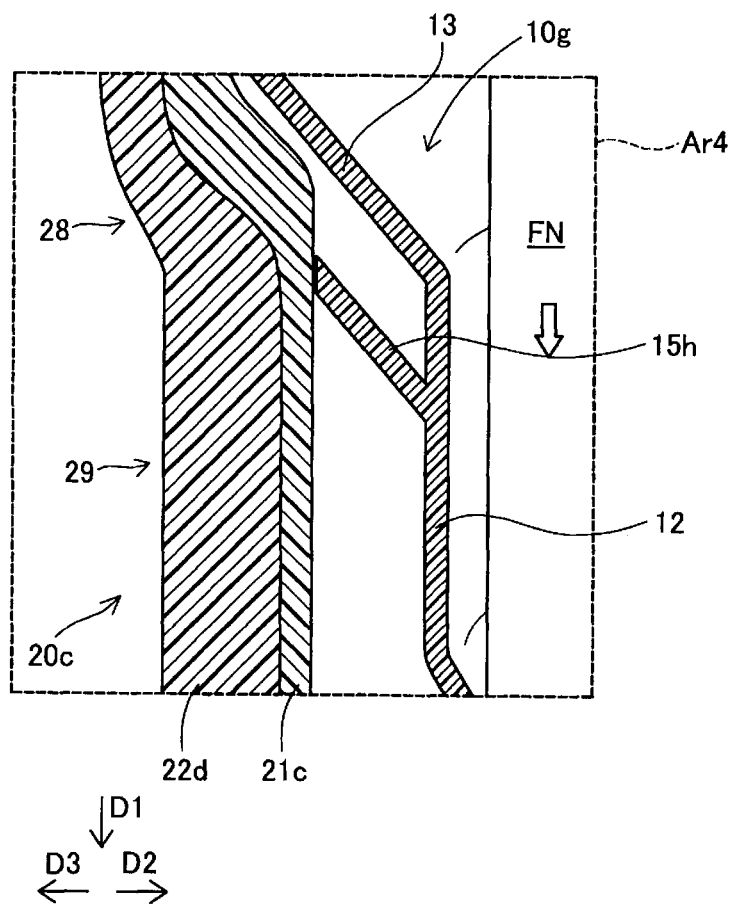
FIG. 23 is an enlarged explanatory view of an area Ar4 shown in FIG. 22.

FIG. 23 is an enlarged explanatory view of an area Ar4 shown in FIG. 22. The area Ar4 is an area which includes a part of the contact portion between the injection port forming member 10g and flow path forming member 20c. In FIG. 23, similarly to FIG. 4, the area Ar4 is disposed at a similar position to the area Ar1 shown in FIG. 3. Also, FIG. 23 shows a state of the area Ar4 during fueling, and shows a state where the fueling nozzle FN is not displaced in the prying direction. The displacement of the fueling nozzle FN in the prying direction is discussed later.

An impact absorbing part 15h of the sixth embodiment is connected to the substantially central portion of the body part 12 of the injection port forming member 10g along the fueling direction D1, and has a substantially annular external shape projecting over the whole periphery thereof along the peripheral direction in a direction intersecting with the outside diameter direction D3. The impact absorbing part 15h has a linear section shape and is disposed so as to go further in the opposite direction to the fueling direction D1 as it becomes more distant from the connected portion to the body part 12, in other words, as it approaches its own end. As shown in FIG. 23, in a state where the fueling nozzle FN is not displaced in the prying direction, the end of the impact absorbing part 15h is in contact with the inner peripheral surface of the inside layer 21c. Due to such contact, the injection port forming member 10g is supported by the flow path forming member 20c and is thereby prevented from being displaced at least in a direction intersecting with the fueling direction D1 including the prying direction.

Figure 24:
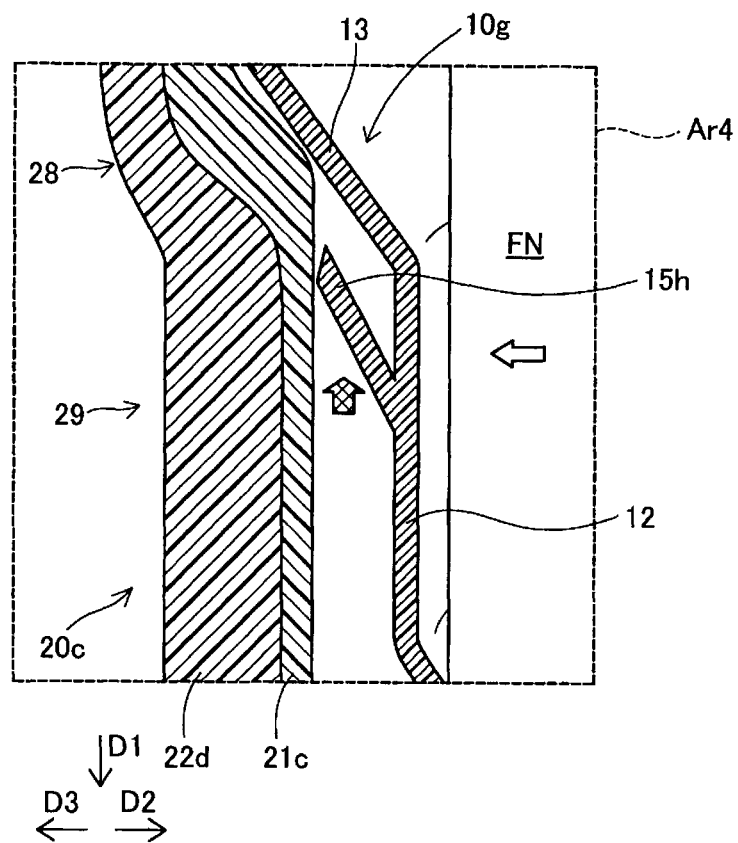
FIG. 24 is an enlarged explanatory view of the area Ar4 when a fueling nozzle is displaced in a prying direction in the sixth embodiment.

FIG. 24 is an enlarged explanatory view of the area Ar4 when the fueling nozzle FN is displaced in the prying direction in the sixth embodiment. During fueling, when a user moves the fueling nozzle FN in a direction perpendicular to the fueling direction D1, as shown by hollow arrows in FIG. 24, the fueling nozzle FN is enabled to move in the prying direction (radial direction). Such movement of the fueling nozzle FN can occur, for example, when the user rests the fueling nozzle FN on the fuel supply apparatus. When the fueling nozzle FN is moved in the prying direction in this manner, the impact absorbing part 15h receives an external force applied from the fueling nozzle FN and is thereby flexed. Specifically, as shown by hatched arrows in FIG. 24, the impact absorbing part 15h is flexed in the opposite direction to the fueling direction D1 as a whole. In this case, the nearer to the leading end of the impact absorbing part 15h the portion of the impact absorbing part 15h is, the more greatly the portion is displaced. Therefore, the length of the impact absorbing part 15h along the radial direction (prying direction) shown in FIG. 24 is shorter than when the fueling nozzle FN is not displaced. Here, in an area (not shown) disposed on the opposite side to the area Ar4 shown in FIG. 24 across a center axis CX, the length of the impact absorbing part 15h along the radial direction (prying direction) is longer than when the fueling nozzle FN is not displaced.

In the fuel supply apparatus of the sixth embodiment having the above configuration, in the resting time of the fueling nozzle FN during fueling, when an external force in the prying direction is applied from the fueling nozzle FN to the injection port forming member 10g, at least a part of an impact given by such external force is absorbed by the impact absorbing part 15h being flexed, thereby enabling suppression of damage against the injection port forming member 10g.

In addition, since the impact absorbing part 15h is in contact with the inner peripheral surface of the flow path forming member 20c (inside layer 21c) without being connected thereto, when compared with a configuration in which it is connected to the inner peripheral surface of the flow path forming member 20c, the transmission of the impact absorbed by the impact absorbing part 15h to the flow path forming member 20c through the inner peripheral surface of the flow path forming member 20c can be suppressed, thereby enabling suppression of damage against the flow path forming member 20c. Also, since the impact absorbing part 15h is in contact with the inner peripheral surface of the flow path forming member 20c (inside layer 21c) without being connected thereto, when compared with a configuration in which it is connected to the inner peripheral surface of the flow path forming member 20c, the fuel supply apparatus can be manufactured easily.

G Seventh Embodiment

In the sixth embodiment, the injection port forming member 10g includes the impact absorbing part 15h. Meanwhile, in this embodiment, a flow path forming member includes an impact absorbing part.

Figure 25:
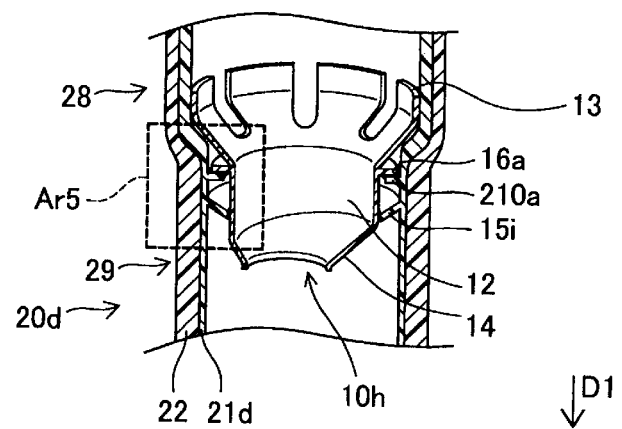
FIG. 25 is a broken perspective view of a part of a fuel supply apparatus according to a seventh embodiment.

FIG. 25 is a broken explanatory view of a part of a fuel supply apparatus of the seventh embodiment. In FIG. 25, for convenience of illustration, there is shown only an area centered on the position where an injection port forming member 10h is mounted. The fuel supply apparatus of the seventh embodiment is different from the fuel supply apparatus 40 of the first embodiment in the specific configuration of the flow path forming member and in the specific configuration of the injection port forming member. Since the remaining configurations of the fuel supply apparatus of the seventh embodiment are the same as the fuel supply apparatus 40, the same composing elements are given the same designations and thus the detailed description thereof is omitted.

A flow path forming member 20d of the seventh embodiment is different from the flow path forming member 20 of the first embodiment in that it includes an inside layer 21d instead of the inside layer 21. Since the remaining composing elements of the flow path forming member 20d are the same as the flow path forming member 20 of the first embodiment, the same composing elements are given the same designations and thus the detailed description thereof is omitted. The inside layer 21d of the seventh embodiment is different from the inside layer 21 of the first embodiment in that it includes a supporting projection part 210a instead of the supporting projection part 210 and also includes an impact absorbing part 15i.

The supporting projection part 210a of the seventh embodiment is different from the supporting projection part 210 of the first embodiment in that, in the body part 12, it is disposed further on the base end side than the supporting projection part 210, whereas the remaining configurations thereof are the same as the supporting projection part 210. On the supporting projection part 210a, there is arranged a supported projection part 16a (to be discussed later) of the injection port forming member 10h.

Figure 26:
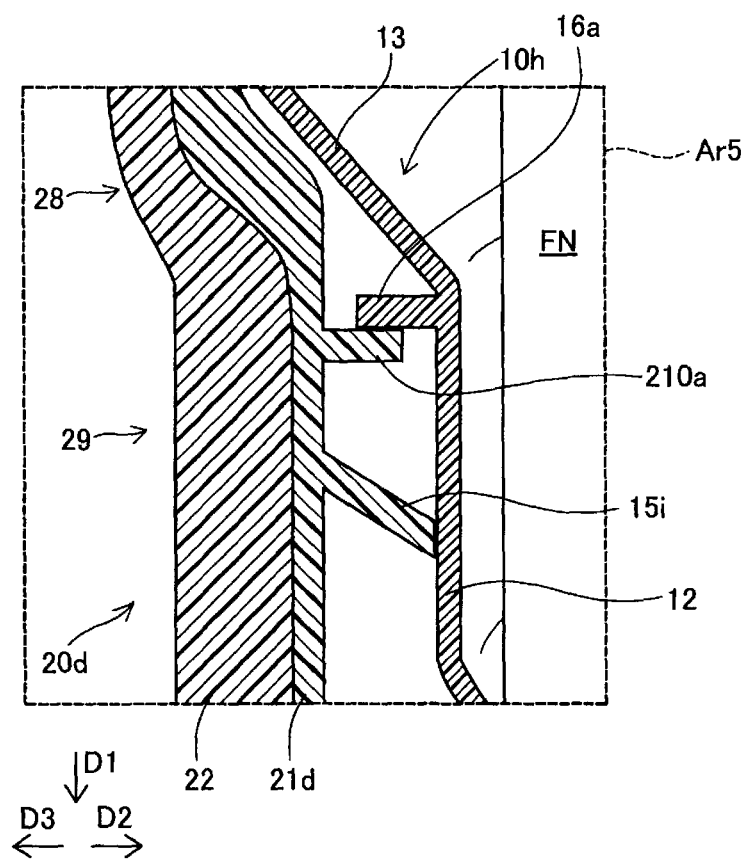
FIG. 26 is an enlarged explanatory view of an area Ar5 shown in FIG. 25.

FIG. 26 is an enlarged explanatory view of an area Ar5 shown in FIG. 25. The area Ar5 is an area which includes a part of the contact portion between the injection port forming member 10h and flow path forming member 20d. In FIG. 26, similarly to FIG. 4, the area Ar5 is disposed at a similar position to the area Ar1 shown in FIG. 3. Also, FIG. 26 shows the area Ar5 during fueling. Here, FIG. 26 shows a state where the fueling nozzle FN is not displaced in the prying direction.

An impact absorbing part 15i according to the seventh embodiment is connected to the inner peripheral surface of such portion of the inside layer 21d as corresponds to a pipe part 29, and has a substantially annular external shape projecting over the whole periphery thereof along the peripheral direction in a direction intersecting with the inside diameter direction. The impact absorbing part 15i has a linear section shape and is disposed so as to go further gradually in the fueling direction D1 as it becomes more distant from the connecting portion to the inside layer 21d, in other words, as it approaches the end thereof. As shown in FIG. 26, in a state where the fueling nozzle FN is not displaced in the prying direction, the end of the impact absorbing part 15i is in contact with the outer peripheral surface of the injection port forming member 10h (body part 12). Due to such contact, the injection port forming member 10h is supported by the flow path forming member 20d, thereby enabling suppression of the displacement thereof at least in a direction intersecting with the fueling direction D1 including the prying direction.

Figure 27:
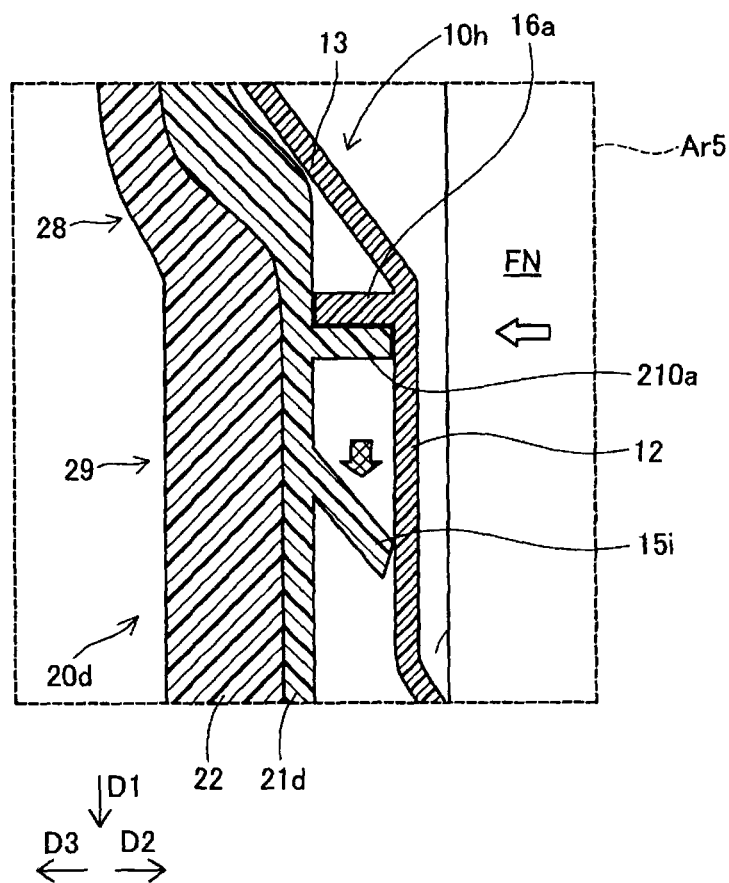
FIG. 27 is an enlarged explanatory view of the area Ar5 when a fueling nozzle is displaced in a prying direction in the seventh embodiment.

FIG. 27 is an enlarged explanatory view of the area Ar5 when the fueling nozzle FN is displaced in a prying direction in the seventh embodiment. During fueling, when the fueling nozzle FN moves in the prying direction (radial direction) as shown by hollow arrows in FIG. 27, the impact absorbing part 15i receives an external force from the fueling nozzle FN and is thereby flexed. Specifically, as shown by hatched arrows in FIG. 27, the impact absorbing part 15i is displaced in the fueling direction D1 as a whole. In this case, in the impact absorbing part 15i, the nearer to the leading end thereof the portion thereof is, the more greatly the portion is displaced. Therefore, the length of the impact absorbing part 15i shown in FIG. 27 along the radial direction (prying direction) is shorter than when the fueling nozzle FN is not displaced. Here, in an area (not shown) disposed on the opposite side to the area Ar5 shown in FIG. 27 across the central axis CX, the length of the impact absorbing part 15i along the radial direction (prying direction) is longer than when the fueling nozzle FN is not displaced.

With the fuel supply apparatus of the seventh embodiment having the above configuration, in the resting time of the fueling nozzle FN during fueling, when an external force in the prying direction is applied from the fueling nozzle FN to the injection port forming member 10h, at least a part of an impact given by such external force is absorbed by the impact absorbing part 15i being flexed, thereby enabling suppression of damage against the injection port forming member 10h.

In addition, since the impact absorbing part 15i is in contact with the outer peripheral surface of the injection port forming member 10h (body part 12) without being connected thereto, when compared with a configuration in which it is connected, the fuel supply apparatus can be manufactured easily.

H. Modifications

H1. Modification 1

In the first to fifth embodiments and their modifications, the impact absorbing parts 15, 15a~15g, when inserting the fueling nozzle FN, absorb an impact given by the external force applied from the fueling nozzle FN. Also, of course, during fueling as well, they can absorb an impact given by the external force applied from the fueling nozzle FN. For example, during fueling, when a user presses the fueling nozzle FN into the fuel supply apparatus 40, they can absorb an external force in the fueling direction D1 applied from the fueling nozzle FN. And, in the sixth and seventh embodiments, the impact absorbing parts 15h and 15i, in the resting time of the fueling nozzle FN during fueling, absorb the impact given by the external force applied from the fueling nozzle FN; and, of course, they can absorb the impact given by the external force applied from the fueling nozzle FN when inserting the fueling nozzle FN. For example, in the inserting time of the fueling nozzle FN, when a user swings the leading end of the fueling nozzle FN in the prying direction (radial direction), an external force in the prying direction is applied from the fueling nozzle FN to the injection port forming members 10g and 10h. Even in this case, an impact given by such external force can be absorbed by the impact absorbing parts 15h and 15i.

H2. Modification 2

A penetration hole may also be formed in the first embodiment and its modification as well as in the projection body 151 of the third embodiment. According to such configuration, the rigidity of the impact absorbing parts 15, 15a~15e can be reduced, thereby enabling them to flex more greatly. Such penetration hole may be, for example, an annular penetration which is continuous over the whole periphery. Also, multiple penetrations each having a fan-like shape in a plan view may also be formed at given intervals along the peripheral direction. Also, the projection body 151 extends along the outside diameter direction D3. However, it may also extend in a direction intersecting with the outside diameter direction D3. For example, it may also extend so as to go further gradually in the fueling direction D1 as it goes away from the connecting portion to the body part 12 toward the end portion thereof. Such configuration can increase a range (flection margin) in which the projection body 151 can be flexed until it strikes the leading end projection portion 212.

H3. Modification 3

In the second embodiment and its modification, the body part 12a includes the multiple penetration holes 121. However, at least one of the penetration holes 121 may also be constituted of a cavity which goes from the outer peripheral surface of the body part 12a having an open outer peripheral surface side toward the inner peripheral surface. In such configuration as well, since such portions of the beam portions 156 and 156a of the impact absorbing parts 15c and 15d as correspond to the cavity are not supported by the body part 12a, the beam portions 156 and 156a can be flexed greatly. Also, in the second embodiment and its modification, the penetrations 121 and cavity may not be formed. In such configuration, on such surface sides of the beam portions 156 and 156a as are opposed to the body part 12a, there may be formed notches the opposed side surface sides of which are opened and which extend in the outside diameter direction. In such configuration as well, since the beam portions 156 and 156a are not supported in the notches thereof by the body part 12a, they can be flexed greatly.

H4. Modification 4

In the impact absorbing parts 15a and 15b of the modifications of the first embodiment, the notch 154 is constituted of multiple notches; however, it may also be a single notch. Also, in the impact absorbing part 15f of the fourth embodiment, similarly to the impact absorbing parts 15a and 15b of the modifications of the first embodiment, one or multiple notches may be formed. Also, a penetration hole may be formed in the annular base portion 211a of the impact absorbing part 15f of the fourth embodiment. In these configurations, the rigidity of the impact absorbing part 15f can be reduced, thereby enabling greater flection thereof.

H5. Modification 5

In the sixth embodiment, the impact absorbing part 15h is arranged so as to go further gradually in the opposite direction to the fueling direction D1 as going away further from the connecting portion to the body part 12. To the contrary, however, it may be arranged so as to go further gradually in the fueling direction D1 as going away further from the connecting portion to the body part 12. Similarly, in the seventh embodiment, the impact absorbing part 15h is arranged so as to go further gradually in the fueling direction D1 as going away further from the connecting portion to the inside layer 21d. To the contrary, however, it may be arranged so as to go further gradually in the opposite direction to the fueling direction D1. Also, the impact absorbing part 15h of the sixth embodiment and the impact absorbing part 15i of the seventh embodiment may also include one or more notches.

H6. Modification 6

In the sixth embodiment, the end of the impact absorbing part 15h is in contact with the inner peripheral surface of the inside layer 21c in a state where the fueling nozzle FN is not displaced in the prying direction. However, the invention is not limited to this. The end of the impact absorbing part 15h may not be in contact with the inner peripheral surface of the inside layer 21c in the inserted state and in a state where the fueling nozzle FN is not displaced in the prying direction, but it may be contacted with the inner peripheral surface of the inside layer 21c after the fueling nozzle FN is displaced in the prying direction. Also, the end of the impact absorbing part 15h may not be contacted with the inner peripheral surface of the inside layer 21c in the non-inserted state (an initial state in which the injection port forming member 10g is assembled to the flow path forming member 20c), but it may be contacted with the inner peripheral surface of the inside layer 21c after the inserted state is attained (whether the fueling nozzle FN is displaced in the prying direction or not). Similarly, in the seventh embodiment, the end of the impact absorbing part 15i is in contact with the outer peripheral surface of the injection port forming member 10h (body part 12) in a state where the fueling nozzle FN is not displaced in the prying direction. However, the invention is not limited to this. The end of the impact absorbing part 15*i* may not be contacted with the outer peripheral surface of the injection port forming member 10*h* in the inserted state and in a state where the fueling nozzle FN is not displaced in the prying direction, but it may be contacted with the outer peripheral surface of the injection port forming member 10*h* after the fueling nozzle FN is displaced in the prying direction. Also, the impact absorbing part 15*i* may not be contacted with the outer peripheral surface of the injection port forming member 10*h* in the non-inserted state (the initial state in which the injection port forming member 10*h* is assembled to the flow path forming method 20*d*), but it may be contacted with the outer peripheral surface of the injection port forming member 10*h* after the inserted state is attained (whether the fueling nozzle FN is displaced in the prying direction or not).

H7. Modification 7

Figure 28:
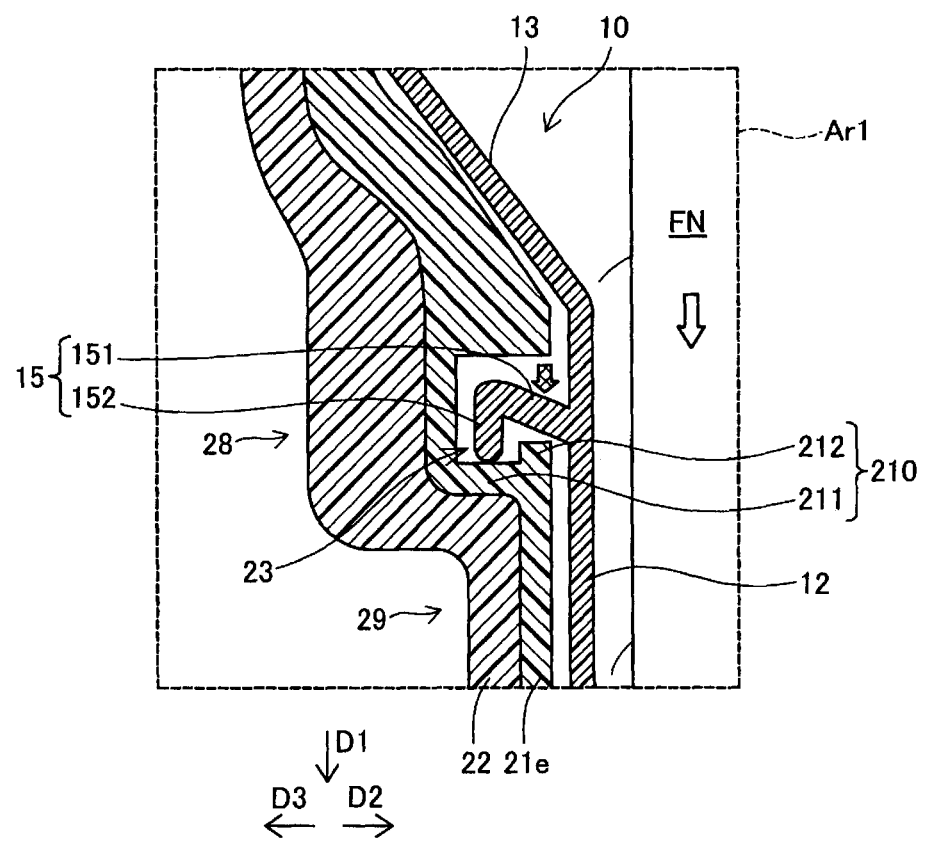
FIG. 28 is an enlarged explanatory view of the area Ar1 in the inserted state of a first example of the modification.

In the first embodiment, the supporting projection part 210, as shown in FIG. 4, projects in the inside diameter direction D2. However, the invention is not limited to this. FIG. 28 is an enlarged explanatory view of the Ar1 in the inserted state according to a first example of the modification. A flow path forming member of the first example of the modification is different from the flow path forming member 20 of the first embodiment shown in FIG. 4 in that it includes an inside layer 21*e* instead of the inside layer 21, while the remaining configurations thereof are the same as the flow path forming member 20. In the inside layer 21*e* of the first example of the modification, the thickness of such portion thereof as exists upwardly of the support projection part 210 is larger than the inside layer 21 of the first embodiment. In the inside layer 21*e*, there is formed an annular groove 23 which is open in the inside diameter direction D2. The other portions of the impact absorbing part 15 than the root portion of the projection body 151 are stored in the annular groove 23. In this example, the supporting projection part 210 corresponds to the bottom portion (portion having a vertically lower side surface) of the annular groove 23. In this configuration, the supporting projection part 210 does not project in the inside diameter direction D2 when the inside layer 21*e* is viewed as a whole. However, with reference to such inner peripheral surface of the annular groove 23 as is situated in the end thereof in the outside diameter direction D3, the supporting projection part 210 projects in the inside diameter direction D2.

Figure 29:
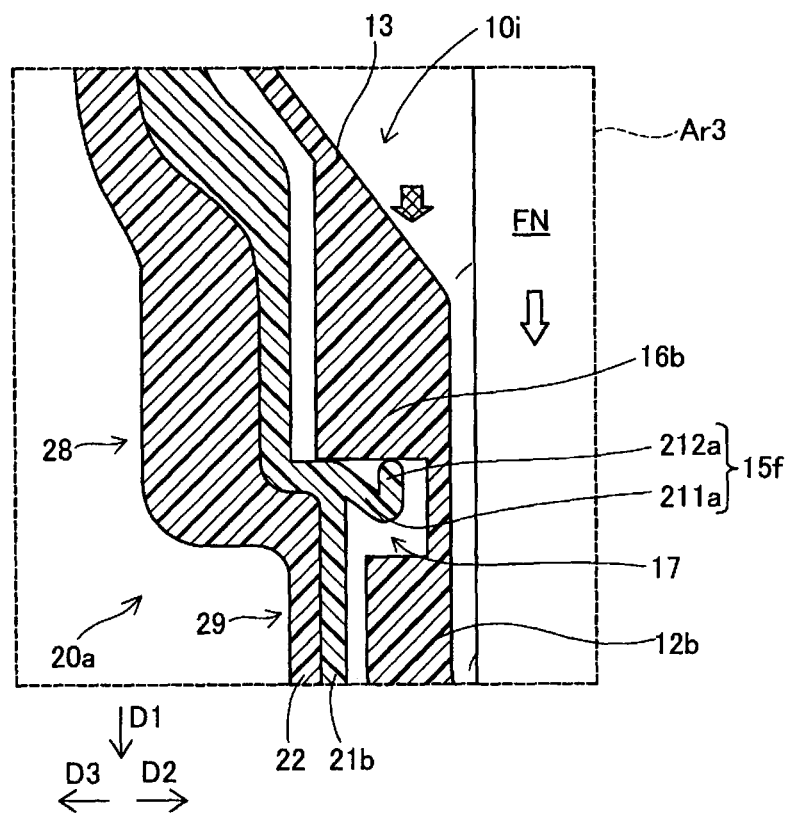
FIG. 29 is an enlarged explanatory view of the area Ar3 in the inserted state of a second example of the modification.

Similarly, in the fourth embodiment, the supported projection part 16, as shown in FIG. 18, projects in the outside diameter direction D3. However, the invention is not limited to this. FIG. 29 is an enlarged explanatory view of the area Ar3 in the inserted state of the second example of the modification. An injection port forming member 10*i* of the second example of the modification is different from the injection port forming member 10*f* of the fourth embodiment shown in FIG. 18 in that it includes a body part 12*b* instead of the body part 12, while the other configurations thereof are the same as the injection port forming member 10*f*. The thickness of the body part 12*b* of the second example of the modification is larger than that of the body part 12 of the fourth embodiment. Also, the body part 12*b* is different from the body part 12 in that it includes a supported projection part 16*b* instead of the supported projection part 16, while the other configurations thereof are the same as the body part 12. The supported projection part 16*b* is formed thicker than the other portion. Below the supported projection part 16*b*, there is formed an annular groove 17 which is open in the outside diameter direction D3. In the annular groove 17, there is stored an impact absorbing part 15*f*. The vertically lower surface of the supported projection part 16*b* has a similar function to the vertically lower surface (surface in the fueling direction D1) of the supported projection part 16 of the fourth embodiment. The supported projection part 16*b* does not project in the outside diameter direction D3 when the injection port forming member 10*i* is viewed as a whole. However, with reference to such inner peripheral surface of the annular groove 17 as is situated in the end thereof in the inside diameter direction D2, the supported projection part 16*b* projects in the outside diameter direction D3. The above-mentioned first and second examples also provide similar effects to the first and fourth embodiments. Here, the first and second examples of the modification can also be applied to other embodiments.

H8. Modification 8

In the respective embodiments and their modifications, the fuel supply apparatus 40, 40*a* is connected directly to the fuel tank FT. However, the invention is not limited to this. There may also be employed a configuration in which the fuel supply apparatus 40, 40*a* is connected through one or multiple joints, or one or multiple pipes, to the fuel tank FT. In this configuration, the fuel supply apparatus 40, 40*a* and joints and pipes intervening between the fuel supply apparatus 40, 40*a* and fuel tank FT correspond to the lower concept of the fuel apparatus according to Claims.

H9. Modification 9

In the respective embodiments and their modifications, the fuel supply apparatus 40, 40*a* are structured such that, by mounting the fuel cap FC thereon, the fuel flow path 20P (fueling port) can be opened and closed. However, the invention is not limited to the fuel supply apparatus having such structure.

Figure 30:
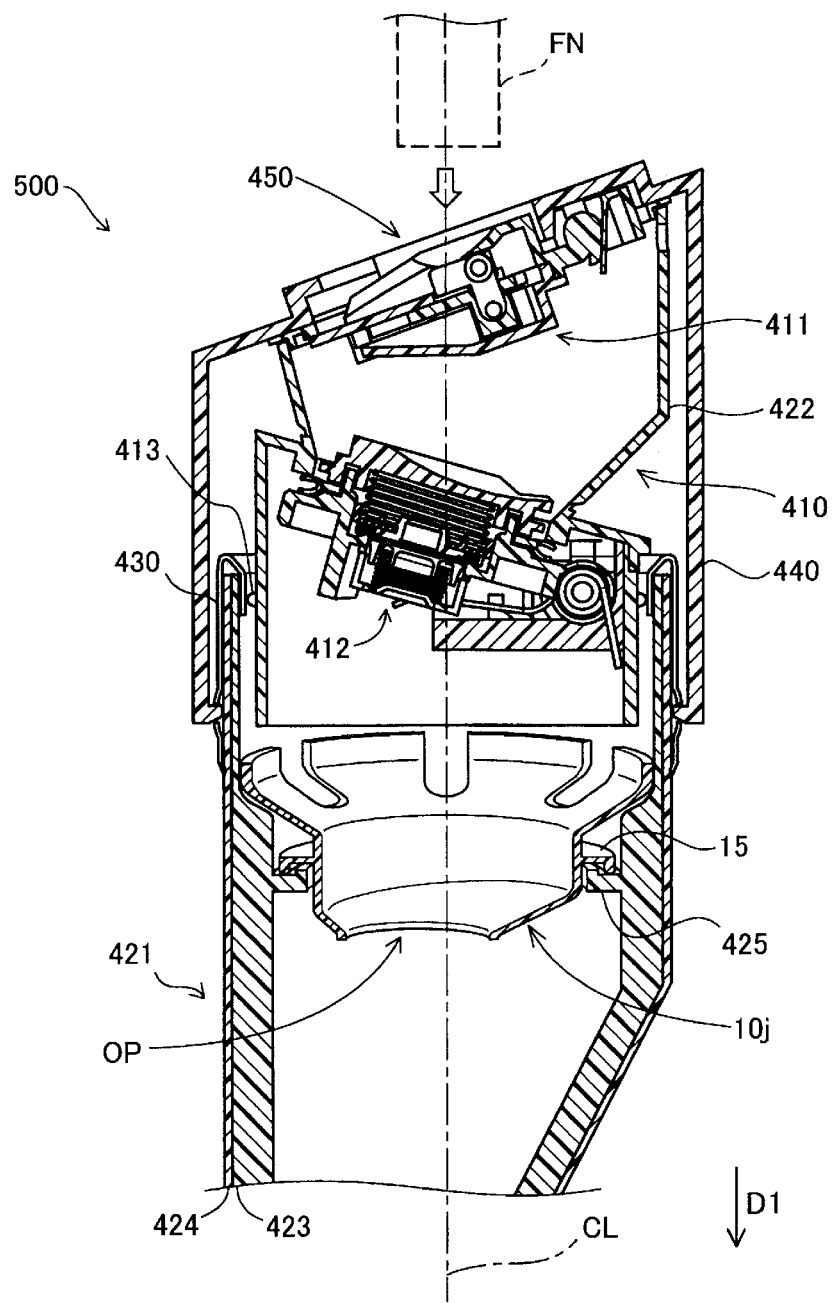
FIG. 30 is a section view of the schematic configuration of a fuel supply apparatus according to a third example of the modification.

FIG. 30 is a section view of a schematic configuration of a fuel supply apparatus 40*b* according to a third example of the modification. The fuel supply apparatus 40*b* has a structure which can open and close a fuel flow path 20P*a* without using the fuel cap FC. When performing refueling using the fuel supply apparatus 40*b*, a user can insert the leading end of the fueling nozzle FN into the fuel supply apparatus 40*b* to thereby push a valve open, and can supply fuel into a fuel tank (not shown) from a fueling port 450 which appears by such valve opening. Here, in FIG. 30, the fueling nozzle FN is not yet inserted into the fuel supply apparatus 40*b* but the fueling port 450 is closed. In FIG. 30, the fueling direction D1 is shown similarly to the respective embodiments.

The fuel supply apparatus 40*b* includes a first flow path forming member 421, a retainer 430, a valve mechanism 410, a cover member 440, and an injection port forming member 10*j*. The composing elements of the fuel supply apparatus 40*b* respectively have a substantially cylindrical or annular external shape, and the central axes thereof are substantially coincident with the center axis CL of the fuel supply apparatus 40*b*.

The first flow path forming member 421 corresponds to the flow path forming member 20 of the first embodiment, has a cylindrical external shape, and includes an inside layer 423 and an outside layer 424. The inside layer 423 and outside layer 424 are formed of the same material as the inside layer 21 and outside layer 22 and thus the detailed description thereof is omitted. The inside layer 423 includes a supporting projection 425. The supporting projection 425 has a similar structure as the supporting projection 210 of the first embodiment and thus the detailed description thereof is omitted.

The retainer 430 is mounted on the end of the first flow path forming member 421 on the base end side. The retainer 430 has a similar function to the retainer 30 of the first embodiment and thus the detailed description thereof is omitted.

The valve mechanism 410 includes a second flow path forming member 422, a first flap valve mechanism 411, and a second flap valve mechanism 412. The second flow path forming member 422 has a cylindrical external shape and constitutes a part of the fuel flow path 20Pa on the base end side. On the end of the second flow path forming member 422 on the base end side, there is mounted the first flap valve mechanism 411. On the substantially central portion of the second flow path forming member 422 along the fueling direction D1, there is mounted the second flap valve mechanism 412. In such portion of the outer peripheral surface of the second flap valve mechanism 412 as exists near to a position where the second flap valve mechanism 412 is mounted, there is formed a screw portion 413. The screw portion 413 is screwed to a screw portion (which corresponds to the screw portion 331 of the first embodiment) formed in the inner peripheral surface of the retainer 430, whereby the valve mechanism 410 is mounted onto the first flow path forming member 421.

The first flap valve mechanism 411 opens or closes the fueling port 450 according to insertion or withdrawal of the fueling nozzle FN. Specifically, when the fueling nozzle FN is inserted into the fuel supply apparatus 40b along the fueling direction D1, the first flap valve mechanism 411 turns in the fueling direction D1. Also, when the inserted fueling nozzle FN is withdrawn, the first flap valve mechanism 411 turns in the opposite direction to the fueling direction D1, thereby closing the fueling port 450. The first flap valve mechanism 411 having this configuration functions as a shielding member for preventing the second flap valve mechanism 412 from being exposed to rainwater, dust, sand etc.

The second flap valve mechanism 412, similarly to the first flap valve mechanism 411, when the fueling nozzle FN is inserted into the fuel supply apparatus 40b along the fueling direction D1, turns in the fueling direction D1. Also, when the inserted fueling nozzle FN is withdrawn, the second flap valve mechanism 412 turns in the opposite direction to the fueling direction D1. The second flap valve mechanism 412 includes a pressure regulating valve and adjusts the internal pressure of the fuel tank to be within a predetermined range using the pressure regulating valve.

The cover member 440 has a substantially cylindrical external shape the inside diameter and outside diameter of which are larger than the first flow path forming member 421 and valve mechanism 410. The cover member 440 covers collectively the valve mechanism 410 and the end portion of the first flow path forming member 421 on base end side. On the base end side of the cover member 440, there is formed an opening in which the first flap valve mechanism 411 is exposed.

The injection port forming member 10j is slightly larger than the injection port forming member 10 of the first embodiment and has the same structure as the injection port forming member 10. Therefore, the injection port forming member 10j includes an impact absorbing part 15 in the outer peripheral surface of the body part thereof, while the impact absorbing part 15 is arranged on the supporting projection part 425 formed in the inside layer 423 of the first flow path forming member 421.

The fuel supply apparatus 40b of the third example of the modification having the above configuration provides similar effects to the fuel supply apparatus 40 of the first embodiment.

The invention is not limited to the above-mentioned embodiments and modifications but it can be realized in various configurations without departing from the gist thereof. For example, the technical characteristics of the embodiments and modifications corresponding to the technical characteristics of the embodiments can be properly replaced and combined in order to solve a part or the whole of the above-mentioned problems, or, in order to attain a part or the whole of the above-mentioned effects. Also, the technical characteristics can be properly deleted so long as they are not described as indispensable in the present specification.

What is claimed is:

1. A fuel supply apparatus for supplying fuel to a fuel tank, comprising:
    a flow path forming member configured to form a fuel flow path; and
    an injection port forming member, arranged in the fuel flow path, configured to form an injection port into which a fueling nozzle, configured to discharge the fuel, is inserted, wherein
    an impact absorbing part is included on one of the flow path forming member and the injection port forming member,
    the impact absorbing member contacts the other of the flow path forming member and the injection port forming member,
    the impact absorbing part is configured to absorb an impact to be produced by the fueling nozzle when the fueling nozzle comes into contact with the injection port forming member,
    the flow path forming member has a cylindrical external shape and includes a supporting projection part projecting in the inside diameter direction along at least a part of the whole periphery of the inner peripheral surface of the flow path forming member,
    the injection port forming member has a cylindrical external shape and is stored in an axial hole of the flow path forming member,
    the impact absorbing part has flexibility, projects in the outside diameter direction at least in a part of the whole periphery of the outer peripheral surface of the injection port forming member along the peripheral direction, and is arranged to be unconnected to the supporting projection part, and
    the impact absorbing part is formed over the whole periphery of the outer peripheral surface of the injection port forming member along the peripheral direction and includes multiple notches arranged side by side in the peripheral direction.

* * * * *